United States Patent
Nakamura

(10) Patent No.: US 9,474,114 B2
(45) Date of Patent: Oct. 18, 2016

(54) LIGHTING DEVICE, LIGHT SOURCE DEVICE, ILLUMINATING DEVICE, AND VEHICULAR HEADLIGHT

(71) Applicant: Panasonic Intellectual Property Management Co., Ltd., Osaka (JP)

(72) Inventor: Toshiaki Nakamura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/795,186

(22) Filed: Jul. 9, 2015

(65) Prior Publication Data

US 2016/0021712 A1      Jan. 21, 2016

(30) Foreign Application Priority Data

Jul. 15, 2014   (JP) .................................. 2014-145426

(51) Int. Cl.
| | |
|---|---|
| *B60Q 1/04* | (2006.01) |
| *H05B 37/02* | (2006.01) |
| *H05B 33/08* | (2006.01) |
| *B60Q 1/14* | (2006.01) |

(52) U.S. Cl.
CPC ......... *H05B 33/0815* (2013.01); *B60Q 1/1415* (2013.01); *H05B 33/0809* (2013.01); *H05B 33/0842* (2013.01)

(58) Field of Classification Search
CPC  B60Q 1/04;  H05B 33/0815;  H05B 33/0854; H05B 33/0842
USPC ........................ 315/82, 185 R, 186, 210, 313
See application file for complete search history.

(56) References Cited

U.S. PATENT DOCUMENTS

| | | | |
|---|---|---|---|
| 2008/0297058 A1* | 12/2008 | Soos ................... | H05B 33/0803 315/185 R |
| 2011/0260648 A1 | 10/2011 | Hamamoto et al. | |
| 2012/0187847 A1* | 7/2012 | Hamamoto ........ | H05B 33/0815 315/125 |
| 2013/0169171 A1 | 7/2013 | Kamizono et al. | |

FOREIGN PATENT DOCUMENTS

| | | |
|---|---|---|
| JP | 2011-138716 A | 7/2011 |
| JP | 2011-198821 A | 10/2011 |
| JP | 2011-233637 A | 11/2011 |
| JP | 2013-136298 A | 7/2013 |
| JP | 2014-017115 A | 1/2014 |

* cited by examiner

*Primary Examiner* — Daniel D Chang
(74) *Attorney, Agent, or Firm* — Renner, Otto, Boisselle & Sklar, LLP

(57) ABSTRACT

The lighting device according to the present invention is used for lighting a light source device. The light source device includes a light source unit connected between first and second power supply terminals and a first impedance device which has an impedance associated with an electric property of the light source unit and is connected to the second power supply terminal. The lighting device performs a first process and a second process. In the first process, the lighting device obtains a measurement indicative of the impedance by supplying power to the first impedance device via the second power supply terminal while prohibiting output of DC power for lighting, and determine an operating condition based on the measurement. In the second process, the lighting device operates so that the DC power for lighting satisfies the operating condition.

11 Claims, 7 Drawing Sheets

LIGHTING DEVICE, LIGHT SOURCE DEVICE, ILLUMINATING DEVICE, AND VEHICULAR HEADLIGHT

CROSS-REFERENCE TO RELATED APPLICATIONS

The application is based upon and claims the benefit of priority of Japanese Patent Application No. 2014-145426, filed on Jul. 15, 2014, the entire contents of which are incorporated herein by reference.

TECHNICAL FIELD

The present invention relates to a lighting device, a light source device to be lit by the lighting device, an illuminating device including the lighting device and the light source device, and a vehicular headlight including the illuminating device.

BACKGROUND ART

As for conventional examples, document 1 (JP 2011-138716 A) discloses a power supply unit (lighting device), a light source unit (light source device), and an illuminating device.

According to the conventional examples disclosed in document 1, even when one selected from various types of light source units is electrically connected to the power supply unit, the power supply unit can supply, to the connected light source unit, power suitable for the connected light source unit.

Each light source unit includes a light source circuit and an identification circuit. The light source circuit is a series circuit of multiple light emitting diodes. The identification circuit is constituted by a resistor with a resistance associated with an electric property of the light source circuit. In each light source unit, one input end of the light source circuit and one end of the identification circuit (resistor) are connected to a plus input terminal, and the other input end of the light source circuit is connected to a minus input terminal, and the other end of the identification circuit is connected to a signal terminal.

The power supply unit includes a power supply circuit (e.g., DC-DC converter) supplying adjustable output, a type determiner, and a lighting controller. The power supply circuit is configured to apply a DC voltage between the two input terminals of the connected light source unit. The type determiner includes a dividing resistor to be connected in series with the identification circuit of the connected light source unit. The type determiner is configured to measure a resistance of the identification circuit (resistor) based on measurement of the voltage across the dividing resistor, and determine the type of the connected light source unit based on the measured resistance. The lighting controller is configured to determine a desired value of a load current in accordance with the determination result of the type determiner, and control the power supply circuit so that an output current has the desired value. Note that, electrical connection between the power supply unit and the light source unit is made by a connector.

In the conventional examples disclosed in document 1, the voltage applied across the light source circuit by the power supply circuit is also applied across the identification circuit, and thereby the number of wirings between the power supply unit and the light source unit is reduced.

Note that, in the conventional examples disclosed in document 1, the connector is used for interconnection between the power supply circuit and the light source unit, and hence a voltage drop may be caused by contact resistance of the connector in supplying power from the power supply circuit to the light source unit. Such a voltage drop is likely to be present on a signal to be detected in determining the type of the connected light source unit. This may cause the type determiner to make false determination with regard to the type of the connected light source unit, and as a result, incorrect output may be supplied to the connected light source unit (i.e., false operation may occur).

SUMMARY OF INVENTION

In view of the above insufficiency, the present invention has aimed to prevent false operation.

The lighting device of one aspect in accordance with the present invention is a lighting device for lighting a light source device. The light source device includes: first and second power supply terminals; a light source unit connected between the first and second power supply terminals; and a first impedance device which has an impedance associated with an electric property of the light source unit and is connected to the second power supply terminal. The lighting device includes: first and second output terminals to be electrically connected to the first and second power supply terminals, respectively; a power converter configured to convert input power from an external device into DC power for lighting and output the DC power for lighting to the light source device via the first and second output terminals; and a controller configured to control the power converter. The controller includes a power supply and is configured to perform a first process and a second process. The controller is configured to, in the first process, obtain a measurement indicative of the impedance of the first impedance device by supplying power from the power supply to the first impedance device via the second output terminal while prohibiting output of the DC power for lighting from the power converter, and determine an operating condition for the power converter based on the measurement. The controller is configured to, in the second process, control the power converter so that the DC power for lighting of the power converter satisfies the operating condition determined in the first process.

The light source device of one aspect in accordance with the present invention includes first and second power supply terminals, a light source unit connected between the first and second power supply terminals, and a first impedance device which has an impedance associated with an electric property of the light source unit and is connected to the second power supply terminal.

The illuminating device of one aspect in accordance with the present invention includes the lighting device and the light source device.

The vehicular headlight of one aspect in accordance with the present invention includes the illuminating device and a lamp fitting which is for holding the illuminating device and is to be attached to a vehicle.

BRIEF DESCRIPTION OF THE DRAWINGS

The figures depict one or more implementation in accordance with the present teaching, by way of example only, not by way of limitations. In the figures, like reference numerals refer to the same or similar elements.

DESCRIPTION OF EMBODIMENTS

Hereinafter, embodiments relating to the lighting devices, the light source devices, the illuminating devices, and the vehicular headlights in accordance with the present invention are described in detail with reference to the attached drawings.

Embodiment 1

Figure 1:
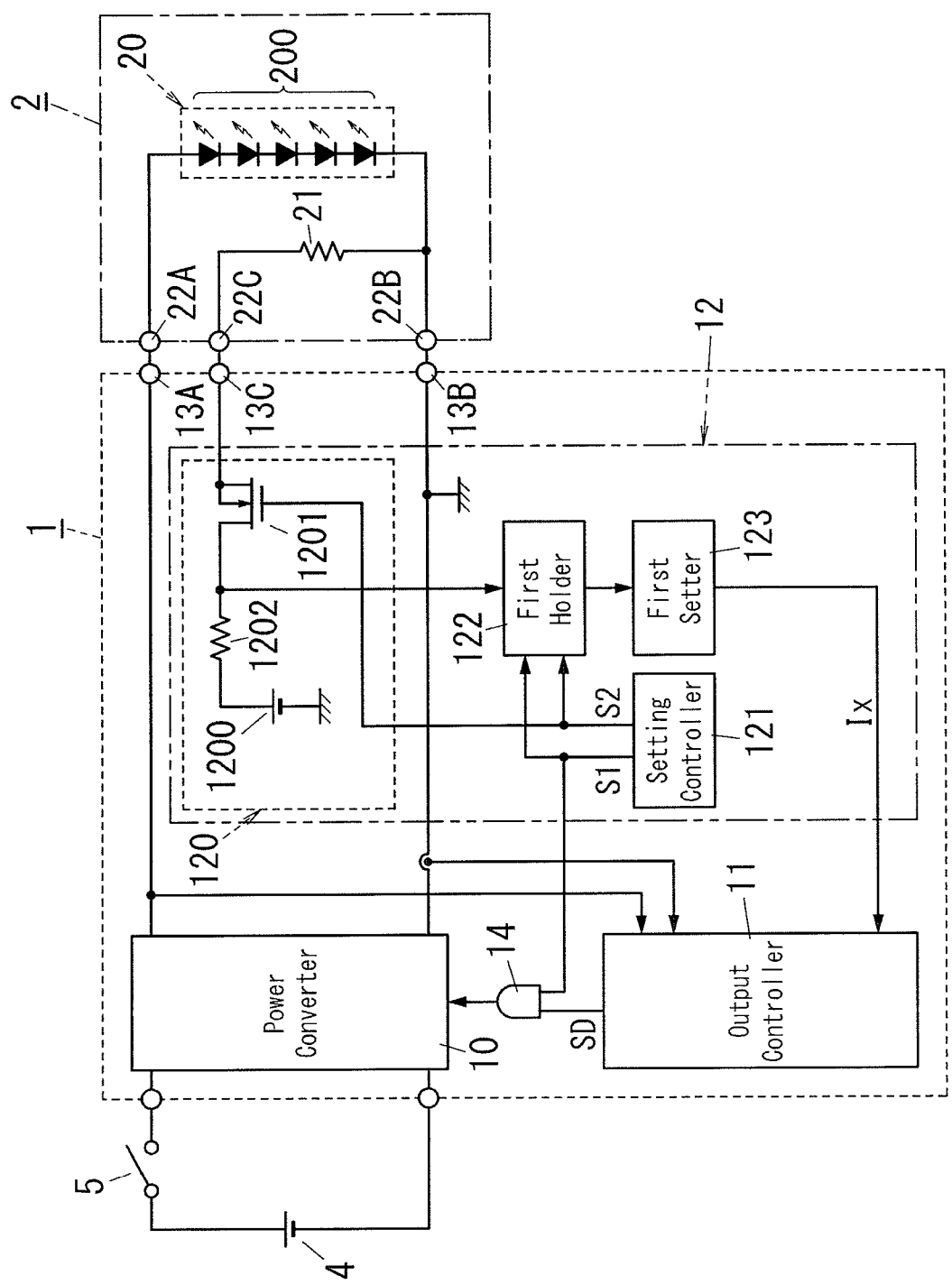
FIG. 1 is a circuit configuration diagram illustrating the illuminating device of Embodiment 1 in accordance with the present invention.

FIG. 1 shows a circuit configuration diagram illustrating a lighting device 1 and a light source device 2 (i.e., an illuminating device) of the present embodiment. The illuminating device of the present embodiment includes the lighting device 1 and the light source device 2.

The light source device 2 is circuitry which mainly includes a light source unit 20, a first impedance device 21, a first power supply terminal 22A, a second power supply terminal 22B, and a signal terminal 22C.

The light source unit 20 is constituted by a series circuit of multiple (five in the illustrated example) light emitting diodes (LEDs) 200. A positive electrode (i.e., an anode of the LED 200 at one end) of the light source unit 20 is electrically connected to the first power supply terminal 22A, and a negative electrode (i.e., a cathode of the LED 200 at the other end) of the light source unit 20 is electrically connected to the second power supply terminal 22B. In other words, the light source unit 20 is connected between the first and second power supply terminals 22A and 22B. Note that, the light source unit 20 may be a solid light emitting device other than light emitting diodes, and for example may be an organic electroluminescence element. In the present embodiment, the first power supply terminal 22A serves as the positive electrode and the second power supply terminal 22B serves as the negative electrode. However, the first power supply terminal 22A may serve as the negative electrode, and the second power supply terminal 22B may serve as the positive electrode.

The first impedance device 21 may be constituted by a resistor. The first impedance device 21 has an impedance (resistance of a resistor) associated with an electric property of the light source unit 20 such as a rated voltage (sum of forward voltages of the LEDs 200) and a rated current of the light source unit 20. A first end of the first impedance device 21 is electrically connected to the signal terminal 22C, and a second end of the first impedance device 21 is electrically connected to the second power supply terminal 22B.

The lighting device 1 includes: first and second output terminals 13A and 13B to be electrically connected to the first and second power supply terminals 22A and 22B, respectively; a power converter 10 configured to convert input power from an external device into DC power for lighting and output the DC power for lighting to the light source device 2 via the first and second output terminals 13A and 13B; and a controller 12 configured to control the power converter 10.

Hereinafter, the lighting device 1 is described in more detail. The lighting device 1 is circuitry which mainly includes the power converter 10, an output controller 11, the controller 12, the first output terminal 13A, the second output terminal 13B, a signal terminal 13C, and an AND gate 14, and is to be electrically connected to an external power supply 4 via a power supply switch 5. For example, the external power supply 4 may be a DC power supply (battery) mounted on a vehicle such as an automobile, or a DC power supply which rectifies and smooths AC power from a commercial AC power source. Note that, while the power supply switch 5 is off, the lighting device 1 does not receive power from the external power supply 4 and therefore does not operate. While the power supply switch 5 is on, the lighting device 1 receives power from the external power supply 4 and therefore operates.

The power converter 10 is configured to convert DC voltage/DC current supplied from the external power supply 4 into DC voltage/DC current suitable for the light source device 2, and output the resultant DC voltage/DC current to the light source device 2 through the first output terminal 13A and the second output terminal 13B. Note that, this power converter 10 may be preferably constituted by a DC-DC converter which is a switching power supply, for example. Alternatively, the power converter 10 may be constituted by a series regulator, or a circuit including a combination of: a DC-DC converter constituted by a switching power supply; and a series regulator.

The output controller 11 is configured to measure output voltage and output current of the power converter 10 and control the power converter 10 so that the output current is equal to a desired value, for example. For example, it is preferable that the output controller 11 be configured to output a drive signal SD which is a PWM (pulse width modulation) signal to adjust a duty cycle of a switching device constituting the power converter 10. For example, the output controller 11 may control the power converter 10 so as to increase the duty cycle while the output current is lower than the desired value, and to decrease the duty cycle while the output current is larger than the desired value.

The AND gate 14 performs logical conjunction of the drive signal SD outputted from the output controller 11 and a first control signal S1 described below. In more detail, when the first control signal S1 has a high level, the drive signal SD of the output controller 11 is applied to the gate of the switching device, and thereby the power converter 10 starts to operate. In contrast, when the first control signal S1 has a low level, the drive signal SD of the output controller 11 is not applied to the gate of the switching device, and therefore the power converter 10 stops operating.

The controller 12 includes a power supply 1200 and is configured to perform a first process (setting process) and a second process (lighting process). Preferably, the controller 12 is configured to perform the first process immediately prior to the second process.

The controller 12 is configured to, in the first process, obtain a measurement (first measurement) indicative of the impedance (first impedance) of the first impedance device 21 by supplying power from the power supply 1200 to the first impedance device 21 via the second output terminal 13B while prohibiting output of the DC power for lighting from the power converter 10, and determine an operating condition for the power converter 10 based on the measurement. The measurement may be the impedance of the first impedance device 21, a detected voltage of the first impedance device 21 (a voltage across the first impedance device 21), or a detected current of the first impedance device 21 (a current flowing through the first impedance device 21).

The controller 12 is configured to, in the second process, control the power converter 10 so that the DC power for lighting of the power converter 10 satisfies the operating condition determined in the first process. For example, the operating condition indicates a desired value (desired voltage value) of voltage or a desired value (desired current value) of current. When the operating condition indicates the desired voltage value, the controller 12 controls the power converter 10 so that a voltage value of the DC power for lighting of the power converter 10 (a value of output voltage of the power converter 10) is equal to the desired voltage value. In this case, the power converter 10 functions as a constant voltage source. In contrast, when the operating condition indicates the desired current value, the controller 12 controls the power converter 10 so that a current value of the DC power for lighting of the power converter 10 (a value of output current of the power converter 10) is equal to the desired current value. In this case, the power converter 10 functions as a constant current source.

Hereinafter, the controller 12 is described in more detail. It is preferable that the controller 12 mainly include a detection block 120, a setting controller 121, a first holder 122, and a first setter 123.

It is preferable that the detection block 120 mainly include the power supply 1200, a switch device 1201, and a voltage dividing resistor 1202. The power supply 1200 is a DC power supply having constant output voltage. A negative electrode of the power supply 1200 is electrically connected to the second output terminal 13B, and a positive electrode of the power supply 1200 is electrically connected to the signal terminal 13C through the voltage dividing resistor 1202 and the switch device 1201.

The switch device 1201 is an n-channel field effect transistor, and has a drain electrically connected to the voltage dividing resistor 1202 and a source electrically connected to the signal terminal 13C. The switch device 1201 has a gate for receiving a second control signal S2 outputted from the setting controller 121, and is configured to turn on when the second control signal S2 has a high level and to turn off when the second control signal S2 has a low level.

The first holder 122 is configured to measure a voltage between a connection point between the voltage dividing resistor 1202 and the switch device 1201 and the second output terminal 13B (ground) and hold (store) the measurement (detected voltage). Note that, the first holder 122 is configured to hold the measurement obtained when the first control signal S1 has a low level and the second control signal S2 has a high level.

It is preferable that the setting controller 121 be configured to output the first control signal S1 and the second control signal S2 at timings mentioned below.

The first setter 123 is configured to read out the measurement held by the first holder 122 and provide the desired value (the desired value Ix of the output current of the power converter 10) associated with this measurement to the output controller 11. The first setter 123 is configured to store multiple desired values Ix individually associated with multiple different measurements, and to select a desired value Ix associated with the measurement read out from the first holder 122.

The first output terminal 13A of the lighting device 1 is electrically connected to the first power supply terminal 22A of the light source device 2, and the second output terminal 13B of the lighting device 1 is electrically connected to the second power supply terminal 22B of the light source device 2. Additionally, the signal terminal 13C of the lighting device 1 is electrically connected to the signal terminal 22C of the light source device 2. Note that, it is preferable that the three terminals 13A to 13C of the lighting device 1 and the three terminals 22A to 22C of the light source device 2 be removably interconnected by use of connectors (a receptacle connector and a plug connector), respectively.

Next, the operation of the lighting device 1 of the present embodiment is described. When the power supply switch 5 is turned on, the output controller 11 and the controller 12 start to operate. The setting controller 121 activates a timer immediately after the time of starting operation, and causes the timer to count a predetermined output setting period. Additionally, until the timer completes counting of the predetermined output setting period, the setting controller 121 sets the first control signal S1 to a low level and sets the second control signal S2 to a high level. While the first control signal S1 has a low level, the output of the AND gate 14 is fixed to a low level, and thereby the power converter 10 stops operating.

While, the second control signal S2 has a high level, and therefore the switch device 1201 turns on. As a result, a constant voltage outputted from the power supply 1200 is applied to a series circuit of the voltage dividing resistor 1202, the switch device 1201, and the first impedance device 21.

The first control signal S1 has a low level and the second control signal S2 has a high level, and therefore the first holder 122 holds the measurement of the voltage at the connection point between the voltage dividing resistor 1202 and the switch device 1201. Note that, this measurement V2 is represented by the relation of $V2=V1 \times R2/(R1+R2)$ wherein V1 represents the voltage of the power supply 1200, R1 represents the resistance of the voltage dividing resistor 1202, and R2 represents the resistance of the first impedance device 21. Note that, contact resistances of the connectors for respectively interconnecting the three terminals 13A to 13C of the lighting device 1 and the three terminals 22A to 22C of the light source device 2 are enough smaller than the resistances of the voltage dividing resistor 1202 and the first impedance device 21, and therefore may be ignored. Additionally, the on-resistance of the switch device 1201 is enough smaller than the resistances of the voltage dividing resistor 1202 and the first impedance device 21, and therefore may be ignored.

The first setter 123 selects the desired value Ix associated with the measurement read out from the first holder 122, and outputs the selected desired value Ix to the output controller 11. The output controller 11 outputs the drive signal SD immediately after the time of activation, and adjusts the duty cycle of the drive signal SD so that the output current is equal to the desired value Ix outputted from the first setter 123. As apparent from the above, the controller 12 performs the first process when starting to operate. In more detail, the controller 12 finishes the first process before a lapse of the output setting period from the time of starting operation.

When the timer finishes counting of the output setting period, the setting controller 121 sets the first control signal S1 to a high level and sets the second control signal S2 to a low level. When the first control signal S1 has a high level, the drive signal SD is outputted from the AND gate 14 and then is applied to the switch device of the power converter 10. Hence, the power converter 10 starts to operate, and thus outputs DC voltage/DC current suitable for the electric property of the light source device 2 to the light source device 2.

When the second control signal S2 has a low level, the switch device 1201 of the detection block 120 is turned off, and thus the power supply 1200 and the signal terminal 13C are separated from each other. Consequently, no current flows through the first impedance device 21 of the light source device 2 and thus no power is consumed. As apparent from the above, the controller 12 performs the second process immediately subsequent to the first process.

In the lighting device 1 of the present embodiment, no current (load current) is supplied from the power converter 10 to the light source unit 20 while the power supply 1200 applies voltage to the first impedance device 21. Therefore, even when the light source unit 20 and the first impedance device 21 are electrically connected to and share the second output terminal 13B, it is possible to avoid undesired effects caused by the load current (effects of voltage drops resulting from the contact resistances of the connectors).

As described above, the lighting device 1 of the present embodiment is a lighting device for lighting (operating) one or more selected from various types of light source devices 2 with different electric properties. The light source device 2 includes: the light source unit 20 including a light source constituted by one or more solid light emitting devices (LEDs 200); the first impedance device 21 having the predetermined impedance associated with the electric property of the light source unit 20; and the pair of power supply terminals 22A and 22B electrically connected to the light source unit 20. Further, the light source device 2 is configured such that at least one power supply terminal (the power supply terminal 22B) is electrically connected to the first impedance device 21.

The lighting device 1 includes: the pair of output terminals 13A and 13B to be electrically connected to the pair of power supply terminals 22A and 22B, respectively; and the power converter 10 for converting input power from an external device into DC power and outputting the resultant DC power through the output terminals 13A and 13B. Additionally, the lighting device 1 further includes the power supply 1200 for providing constant voltage or constant current to the first impedance device 21 via at least one output terminal (output terminal 13B). Moreover, the lighting device 1 includes the controller (the output controller 11 and the controller 12) for controlling the power converter 10 so that the output voltage/output current of the power converter 10 is equal to the desired value Ix.

The controller 12 is configured to measure the impedance of the first impedance device 21 by providing the constant voltage or the constant current from the power supply 1200 to the first impedance device 21 under a condition where the light source unit 20 is not lit in a period from the time of starting operation to the time immediately before lighting.

Alternatively, the controller 12 is configured to measure the voltage or the current of the first impedance device 21 by providing the constant voltage or the constant current from the power supply 1200 to the first impedance device 21 under a condition where the light source unit 20 is not lit in a period from the time of starting operation to the time immediately before lighting. Additionally, the controller 12 is configured to select the desired value Ix associated with the result of the impedance measurement or the detected voltage or the detected current of the first impedance device, and light the light source unit 20 according to the selected desired value.

The lighting device 1 of the present embodiment is configured like above, the impedance measurement of the first impedance device 21 is conducted while no load current of the light source unit flows through the second output terminal 13B connected to the first impedance device 21. Therefore, the lighting device 1 of the present embodiment can avoid effects of voltage drops caused by the contact resistances of the connectors, and thus, in contrast to the conventional example, it is possible to prevent false determination of the impedance of the first impedance device 21 for setting the desired output value.

Further, the light source device 2 of the present embodiment includes: the light source unit 20 including a light source constituted by one or more solid light emitting devices (LEDs 200); and the first impedance device 21 having the predetermined impedance associated with the electric property of the light source unit 20. Moreover, the light source device 2 of the present embodiment includes the pair of power supply terminals 22A and 22B electrically connected to the light source unit 20. The light source device 2 is configured such that at least one of the power supply terminals 22A and 22B is electrically connected to the first impedance device 21. In other words, the light source device 2 includes the first and second power supply terminals 22A and 22B, the light source unit 20 connected between the first and second power supply terminals 22A and 22B, and the first impedance device 21 which has the impedance associated with the electric property of the light source unit 20 and is connected to the second power supply terminal 22B.

Further, the illuminating device of the present embodiment includes the lighting device 1 and the light source device 2. Note that, the desired value of the output current may be directly obtained from the applied voltage detection signal of the first impedance device. In FIG. 1, the detection signal is held, but the desired setting value corresponding to the detection value may be held (stored).

As described above, in the light source device 2 and the illuminating device of the present embodiment, it is possible to prevent false determination by the lighting device 1 with regard to the impedance of the first impedance device 21 of the light source device 2, and therefore prevent false operation.

Embodiment 2

Solid light emitting devices such as LEDs tend to deteriorate with temperature more easily than incandescent lamps and fluorescent lamps. Additionally, when the solid light emitting devices are used for lighting, relatively large current flows through the solid light emitting devices, and this is likely to cause an excess increase in temperatures of the solid light emitting devices. In this case, performance and lifetime of the solid light emitting devices are likely to decrease sharply.

In view of this, the illuminating device (the lighting device 1 and the light source device 2) of the present embodiment is configured to measure a temperature of the light source unit 20 (a temperature of the light source unit 20 itself or an ambient temperature of the light source unit 20), and adjust power supplied from the lighting device 1 to the light source device 2 based on the measurement.

Figure 2:
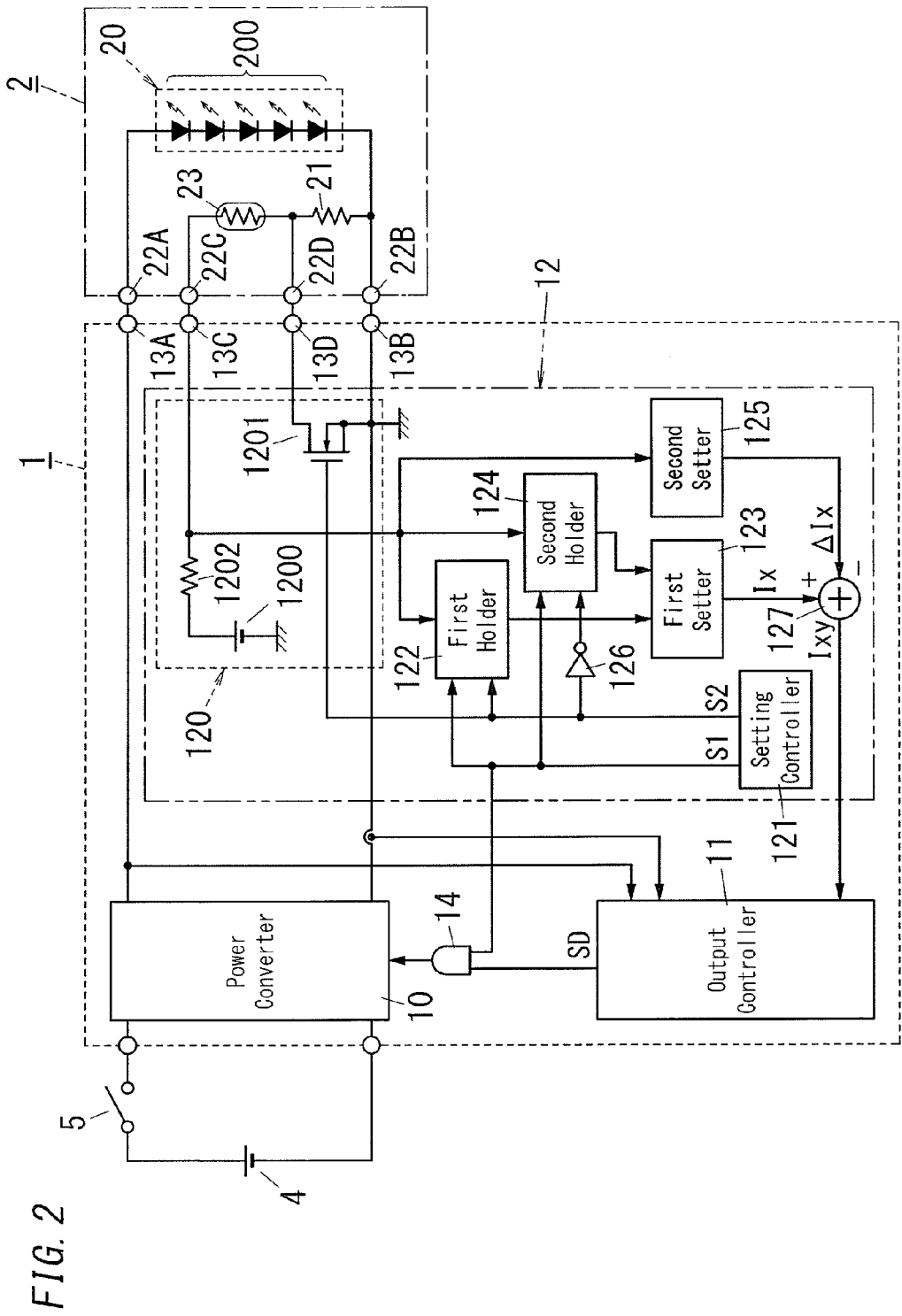
FIG. 2 is a circuit configuration diagram illustrating the illuminating device of Embodiment 2 in accordance with the present invention.

Hereinafter, the lighting device 1 and the light source device 2 of the present embodiment are described with reference to FIG. 2. Note that, the same components as the lighting device 1 and the light source device 2 of Embodiment 1 are designated by the same reference signs as the lighting device 1 and the light source device 2 of Embodiment 1 in order to avoid redundant description.

The light source device 2 includes a series circuit of a second impedance device 23 and the first impedance device 21. The second impedance device 23 is, for example, a thermosensitive resistor such as a positive temperature coefficient thermistor. The second impedance device 23 is configured to have an impedance (resistance) changing depending on a temperature of the light source unit 20.

The light source device 2 includes first and second signal terminals 22C and 22D. In the light source device 2, a first end of the second impedance device 23 is electrically connected to the first signal terminal 22C, and a second end of the second impedance device 23 is electrically connected to the first end of the first impedance device 21 and the second signal terminal 22D. In short, the first and second signal terminals 22C and 22D are electrically connected to the first and second ends of the second impedance device 23, respectively. Further, the first impedance device 21 is connected between the second end of the second impedance device 23 (the second signal terminal 22D) and the second power supply terminal 22B. As a result, the first impedance device 21 and the second impedance device 23 constitute a series circuit.

The lighting device 1 mainly includes the power converter 10, the output controller 11, the controller 12, the first output terminal 13A, the second output terminal 13B, the signal terminal 13C, and the AND gate 14, as with Embodiment 1.

The controller 12 includes the power supply 1200 and is configured to perform the first process and the second process. The power supply 1200 is electrically connected to the first signal terminal 13C. Further, the controller 12 includes a switch (the switch device 1201) connected between a second signal terminal 13D and the second output terminal 13B.

The controller 12 is configured to, in the first process, obtain the first measurement by supplying power from the power supply 1200 to the first impedance device 21 via the second output terminal 13B while prohibiting output of the DC power for lighting from the power converter 10, and determine the operating condition for the power converter 10 based on the first measurement.

Especially, in the first process, the controller 12 obtains the measurement (first measurement) by supplying power from the power supply 1200 to the series circuit (the series circuit of the first impedance device 21 and the second impedance device 23) via the first signal terminal 13C and the second output terminal 13B. In this regard, the controller 12 turns off the switch device 1201 to supply power from the power supply 1200 to the series circuit via the first signal terminal 13C and the second output terminal 13B.

In more detail, the controller 12 turns off the switch device 1201 to supply power from the power supply 1200 to the series circuit via the first signal terminal 13C and the second output terminal 13B in the first process. Thereby, the controller 12 obtains the measurement (third measurement) indicative of the impedance (third impedance) of the series circuit. The third measurement may be the impedance of the series circuit of the first impedance device 21 and the second impedance device 23, a detected voltage of the series circuit (a voltage across the series circuit), or a detected current of the series circuit (a current flowing through the series circuit).

The controller 12 obtains the measurement (second measurement) indicative of the impedance (second impedance) of the second impedance device 23 by supplying power from the power supply 1200 to the second impedance device 23 via the first signal terminal 13C and the second signal terminal 13D while keeping voltage across the first impedance device 21 constant. In this regard, in the second process, the controller 12 turns on the switch (the switch device 1201) to supply power from the power supply 1200 to the second impedance device 23 via the first signal terminal 13C and the second signal terminal 13D while keeping voltage across the first impedance device 21 constant (0 V, in the present embodiment). The second measurement may be the impedance of the second impedance device 23, a detected voltage of the second impedance device 23 (a voltage across the second impedance device 23), or a detected current of the second impedance device 23 (a current flowing through the second impedance device 23).

Further, the controller 12 obtains the first measurement indicative of the impedance of the first impedance device 21, based on the third measurement indicative of the series circuit of the first impedance device 21 and the second impedance device 23 and the second measurement indicative of the impedance of the second impedance device 23.

The controller 12 is configured to, in the second process, control the power converter 10 so that the DC power for lighting of the power converter 10 satisfies the operating condition determined in the first process.

Moreover, the controller 12 is configured to, in the second process, obtain the second measurement by supplying power from the power supply 1200 to the second impedance device 23 via the first and second signal terminals 13C and 13D, and modify, based on the second measurement, the operating condition determined in the first process. In more detail, the controller 12, in the second process, obtains the second measurement by supplying power from the power supply 1200 to the second impedance device 23 via the first signal terminal 13C and the second signal terminal 13D while keeping voltage across the first impedance device 21 constant.

Hereinafter, the controller 12 is described in detail. The controller 12 mainly includes the detection block 120, the setting controller 121, the first holder 122, and the first setter 123, as with Embodiment 1. Additionally, it is preferable that the controller 12 further include a second holder 124, a second setter 125, a NOT gate 126, and an adder 127.

The detection block 120 mainly includes the power supply 1200, the switch device 1201, and the voltage dividing resistor 1202, as with Embodiment 1. The positive electrode of the power supply 1200 is electrically connected to the signal terminal (the first signal terminal 13C) via the voltage dividing resistor 1202.

The drain of the switch device 1201 is electrically connected to the second signal terminal 13D, and the source of the switch device 1201 is electrically connected to the second output terminal 13B. In a similar manner to Embodiment 1, the switch device 1201 is configured to turn on when the second control signal S2 outputted from the setting controller 121 has a high level, and to turn off when the second control signal S2 has a low level.

The first output terminal 13A of the lighting device 1 is electrically connected to the first power supply terminal 22A of the light source device 2, and the second output terminal 13B of the lighting device 1 is electrically connected to the second power supply terminal 22B of the light source device 2. Further, the first signal terminal 13C of the lighting device 1 is electrically connected to the first signal terminal 22C of the light source device 2, and the second signal terminal 13D of the lighting device 1 is electrically connected to the second signal terminal 22D of the light source device 2. Note that, it is preferable that the four terminals 13A to 13D of the lighting device 1 and the four terminals 22A to 22D of the light source device 2 be removably interconnected by use of connectors (a receptacle connector and a plug connector), respectively.

The first holder 122 is configured to measure a voltage between the connection point between the voltage dividing resistor 1202 and the first signal terminal 13C and the second output terminal 13B (ground) and hold (store) the measurement (first detected voltage). Note that, the first holder 122 is configured to hold the measurement (third measurement) obtained when the first control signal S1 has a low level and the second control signal S2 has a high level.

Like the first holder 122, the second holder 124 is configured to measure a voltage between the connection point between the voltage dividing resistor 1202 and the first signal terminal 13C and the second output terminal 13B (ground) and hold (store) the measurement (second detected voltage). The NOT gate 126 is configured to invert the second control signal S2 and output the inverted second control signal S2 to the second holder 124. Therefore, the second holder 124 is configured to hold the measurement (second measurement) obtained when the first control signal S1 has a high level and the second control signal S2 has a high level (the actual input has a low level because the NOT gate 126 inverts the second control signal S2).

It is preferable that the setting controller 121 be configured to output the first control signal S1 and the second control signal S2 at timings mentioned below.

Like the second holder 124, the second setter 125 is configured to measure a voltage between the connection point between the voltage dividing resistor 1202 and the first signal terminal 13C and the second output terminal 13B (ground) and output an adjustment value $\Delta Ix$ corresponding to the measurement (second detected voltage). For example, it is preferable that the adjustment value $\Delta Ix$ be a variable which is zero while the second detected voltage is less than a threshold and increases with an increase in the second detected voltage while the second detected voltage is equal to or more than the threshold.

The adder 127 calculates addition of the desired value Ix outputted from the first setter 123 and a value obtained by multiplying the adjustment value $\Delta Ix$ outputted from the second setter 125 by minus one, that is, subtraction of the adjustment value $\Delta Ix$ from the desired value Ix, to obtain an adjusted desired value Ixy ($=Ix-\Delta Ix$) and output it to the output controller 11. The output controller 11 adjusts the duty cycle of the drive signal SD so that the output current is equal to the desired value Ixy outputted from the adder 127.

Next, the operation of the lighting device 1 of the present embodiment is described. When the power supply switch 5 is turned on, the output controller 11 and the controller 12 start to operate. The setting controller 121 activates the timer immediately after the time of starting operation, and causes the timer to count a first detection period. Further, until the timer completes counting of the first detection period, the setting controller 121 sets each of the first control signal S1 and the second control signal S2 to a low level. While the first control signal S1 has a low level, the output of the AND gate 14 is fixed to a low level, and thereby the power converter 10 stops operating.

The second control signal S2 has a low level, and therefore the switch device 1201 is not turned on. As a result, a constant voltage outputted from the power supply 1200 is applied to the series circuit of the voltage dividing resistor 1202, the first impedance device 21, and the second impedance device 23.

Each of the first control signal S1 and the second control signal S2 has a low level, and therefore the first holder 122 holds the measurement (first detected voltage) of the voltage at the connection point between the voltage dividing resistor 1202 and the first signal terminal 13C. Note that, the first measurement V2 is represented by the relation of $V2=V1\times(R2+Rx)/(R1+R2+Rx)$ wherein V1 represents the voltage of the power supply 1200, R1 represents the resistance of the voltage dividing resistor 1202, R2 represents the resistance of the first impedance device 21, and Rx represents the resistance of the second impedance device 23. Note that, contact resistances of the connectors for respectively interconnecting the four terminals 13A to 13D of the lighting device 1 and the four terminals 22A to 22D of the light source device 2 are enough smaller than the resistances of the voltage dividing resistor 1202, the first impedance device 21, and the second impedance device 23 and therefore may be ignored.

When the timer finishes counting of the first detection period, the setting controller 121 causes the timer to count a second detection period. Additionally, until the timer completes counting of the second detection period, the setting controller 121 keeps the first control signal S1 having a low level and sets the second control signal S2 to a high level. When the second control signal S2 has a high level, the switch device 1201 is turned on. As a result, the switch device 1201 makes a short circuit between the first signal terminal 13C and the second signal terminal 13D.

When the second control signal S2 has a high level, the first holder 122 does not update the first detected voltage. While, a signal with a low level made by inverting the second control signal S2 by the NOT gate 126 is inputted into the second holder 124, and therefore the second holder 124 holds the measurement (second detected voltage) of the voltage at the connection point between the voltage dividing resistor 1202 and the first signal terminal 13C. The first impedance device 21 is short circuited by the switch device 1201, and therefore the second detected voltage V3 is represented by the relation of $V3=V1\times Rx/(R1+Rx)$. Note that, the on-resistance of the switch device 1201 is enough smaller than the resistances of the voltage dividing resistor 1202 and the second impedance device 23, and therefore may be ignored.

The first setter 123 estimates the impedance (resistance) of the first impedance device 21 based on a difference between the first detected voltage V2 held by the first holder 122 and the second detected voltage V3 held by the second holder 124. In line with the above manner, the first setter 123 obtains the first measurement indicative of the impedance of the first impedance device 21. Thereafter, the first setter 123 determines the desired value Ix associated with the estimated impedance, and outputs the determined desired value Ix to the adder 127. The output controller 11 adjusts the duty cycle of the drive signal SD so that the output current is equal to the desired value Ixy outputted from the adder 127.

When the timer finishes counting of the second detection period, the setting controller 121 keeps the second control signal S2 having a high level and sets the first control signal S1 to a high level. When the first control signal S1 has a high level, the drive signal SD is outputted from the AND gate 14 and then is applied to the switch device of the power converter 10. Hence, the power converter 10 starts to operate, and thus outputs DC voltage/DC current suitable for the electric property of the light source device 2 to the light source device 2.

In this regard, while the DC current is supplied from the power converter 10 to the light source unit 20, the second control signal S2 is kept having a high level, and the switch device 1201 is kept turned on. Consequently, no current flows through the first impedance device 21 of the light source device 2 and thus no power is consumed.

Note that, when the temperature of the light source unit 20 increases due to energization, the impedance (resistance) of the second impedance device 23 also increases. When the impedance increases and thereby the second detected voltage V3 exceeds the threshold, the adjustment value ΔIx which increases with an increase in the second detected voltage V3 is outputted from the second setter 125 to the adder 127. Thus, the desired value Ixy outputted from the adder 127 to the output controller 11 is decreased by the adjustment value ΔIx, and therefore the DC current supplied from the power converter 10 to the light source unit 20 is reduced. Consequently, an increase in the temperature of the light source unit 20 is suppressed.

Note that, in the present embodiment, the second impedance device 23 is exemplified by a thermosensitive resistor. However, the second impedance device 23 may be a photoelectric conversion element whose impedance changes depending on intensity of light emitted from the light source unit 20. When the second impedance device 23 is such a photoelectric conversion element, it is possible to adjust the output current depending on intensity of light.

The light source device 2 of the present embodiment includes the second impedance device 23 whose impedance changes depending on the state of the light source unit 20. Further, in the lighting device 1 of the present embodiment, it is preferable that the controller 12 be configured to measure the impedance of the second impedance device 23 while the light source unit 20 is lit, and to modify the desired value Ixy in accordance with the measurement result of the impedance.

In the lighting device 1 of the present embodiment, the controller 12 determines the state (e.g., the temperature) of the light source unit 20 based on the impedance of the second impedance device 23, and modifies the desired value according to the impedance. Therefore, the state of the light source unit 20 can be improved.

Further, it is preferable that the light source device 2 of the present embodiment include the series circuit of the first impedance device 21 and the second impedance device 23. Additionally, in the lighting device 1 of the present embodiment, it is preferable that the controller 12 be configured to measure the impedance of the first impedance device 21 under the following condition while the light source unit 20 is not lit. It is preferable that the aforementioned condition is that a constant voltage or a constant current from the power supply 1200 is supplied to the series circuit, and switching is made so that the voltage drop caused by the contact resistance of the power supply terminal electrically connected to the first impedance device is canceled.

In the light source device 2 and the lighting device 1 of the present embodiment, the first impedance device 21 and the second impedance device 23 constitute the series circuit, and therefore the number of wirings necessary for connection between the lighting device 1 and the light source device 2 can be reduced.

Additionally, in the lighting device 1 of the present embodiment, it is preferable that the controller 12 include the switch (the switch device 1201) electrically connected to the power supply 1200 to be in parallel with the first impedance device 21. It is preferable that the controller 12 be configured to measure the impedance of the first impedance device 21 by turning off the switch to supply a constant voltage or a constant current from the power supply 1200 to the first impedance device 21 while the light source unit 20 is not lit. It is preferable that the controller 12 be configured to measure the impedance of the second impedance device 23 by turning on the switch to supply a constant voltage or a constant current from the power supply 1200 to the second impedance device 23 while the light source unit 20 is lit.

Note that, in a condition where the light source unit 20 is lit, the controller 12 may apply a constant voltage between the first impedance device 21 instead of short circuiting the first impedance device 21 with the switch device 1201. By applying the constant voltage, the controller 12 can measure the impedance of the second impedance device 23 without suffering from voltage drops which would otherwise be caused by the contact resistances of the first impedance device 21 and the terminal 22B.

Embodiment 3

Figure 3:
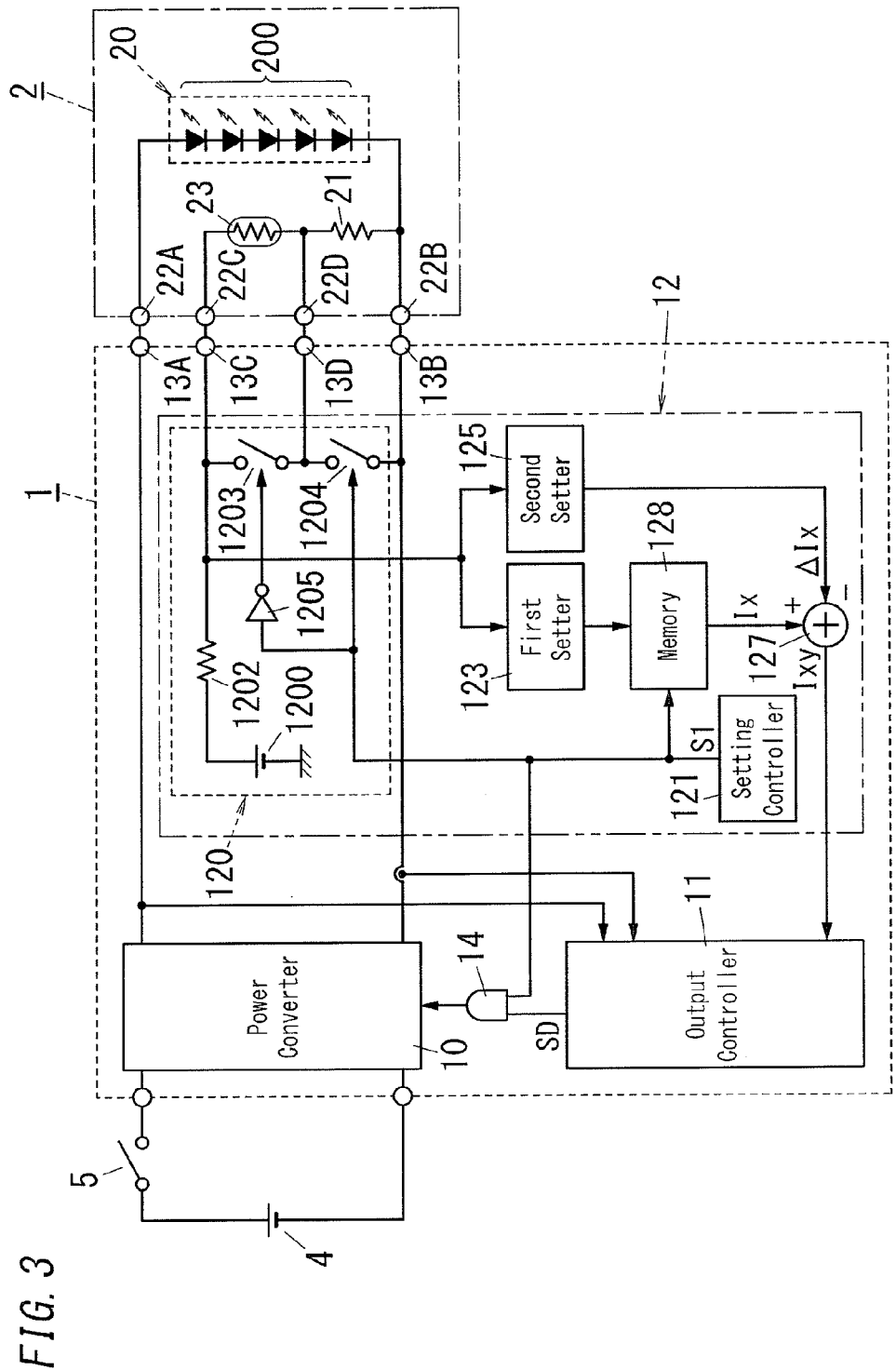
FIG. 3 is a circuit configuration diagram illustrating the illuminating device of Embodiment 3 in accordance with the present invention.

Hereinafter, the lighting device 1 and the light source device 2 of the present embodiment are described with reference to FIG. 3. Note that, the light source device 2 of the present embodiment is same as the light source device 2 of Embodiment 2. Further, the lighting device 1 of the present embodiment is same in basic configurations as the lighting device 1 of Embodiment 2. Note that, the same components as the lighting device 1 and the light source device 2 of Embodiment 2 are designated by the same reference signs as the lighting device 1 and the light source device 2 of Embodiment 2 in order to avoid redundant description.

The lighting device 1 mainly includes the power converter 10, the output controller 11, the controller 12, the first output terminal 13A, the second output terminal 13B, the first signal terminal 13C, the second signal terminal 13D, and the AND gate 14, as with Embodiment 2.

The controller 12 includes the power supply 1200 and is configured to perform the first process and the second process. The power supply 1200 is electrically connected to the first signal terminal 13C. Further, the controller 12 includes a first switch device 1203 connected between the first signal terminal 13C and the second signal terminal 13D and a second switch device 1204 connected between the second signal terminal 13D and the second output terminal 13B.

The controller 12 is configured to, in the first process, obtain the first measurement by supplying power from the power supply 1200 to the first impedance device 21 via the second output terminal 13B while prohibiting output of the DC power for lighting from the power converter 10, and determine the operating condition for the power converter 10 based on the first measurement. Further, the controller 12 is configured to, in the first process, turn on the first switch device 1203 and turn off the second switch device 1204 to supply power from the power supply 1200 to the first impedance device 21 via the second signal terminal 13D and the second output terminal 13B.

The controller 12 is configured to, in the second process, control the power converter 10 so that the DC power for lighting of the power converter 10 satisfies the operating condition determined in the first process.

Moreover, the controller 12 is configured to, in the second process, obtain the second measurement by supplying power from the power supply 1200 to the second impedance device 23 via the first and second signal terminals 13C and 13D, and modify, based on the second measurement, the operating condition determined in the first process. Further, the controller 12 is configured to, in the second process, turn off the first switch device 1203 and turn on the second switch device 1204 to supply power from the power supply 1200 to the second impedance device 23 via the first signal terminal 13C and the second signal terminal 13D while keeping voltage across the first impedance device 21 constant.

Hereinafter, the controller 12 is described in detail. The controller 12 mainly includes the detection block 120, the setting controller 121, the first setter 123, the second setter 125, and the adder 127, as with Embodiment 2. Additionally, it is preferable that the controller 12 further include a memory 128 as an alternative to the first holder 122 and the second holder 124.

The detection block 120 mainly includes the power supply 1200, the voltage dividing resistor 1202, the first switch device 1203, the second switch device 1204, and a NOT gate 1205. The positive electrode of the power supply 1200 is electrically connected to the first signal terminal 13C and a first end of the first switch device 1203 via the voltage dividing resistor 1202. A second end of the first switch device 1203 and a first end of the second switch device 1204 are electrically connected to the second signal terminal 13D. A second end of the second switch device 1204 is electrically connected to the second output terminal 13B. The first switch device 1203 receives the first control signal S1 outputted from the setting controller 121, by way of the NOT gate 1205. Further, the second switch device 1204 directly receives the first control signal S1. Hence, when the first control signal S1 has a high level, the first switch device 1203 is turned off and the second switch device 1204 is turned on. When the first control signal S1 has a low level, the first switch device 1203 is turned on and the second switch device 1204 is turned off. Note that, the first switch device 1203 and the NOT gate 1205 may be preferably p-channel MOSFETs, and the second switch device 1204 may be preferably an n-channel MOSFET.

The memory 128 is configured to, when the first control signal S1 has a low level, store the desired value Ix outputted from the first setter 123, and is configured to, when the first control signal S1 has a high level, output the desired value Ix to the adder 127.

Next, the operation of the lighting device 1 of the present embodiment is described. When the power supply switch 5 is turned on, the output controller 11 and the controller 12 start to operate. The setting controller 121 activates the timer immediately after the time of starting operation, and causes the timer to count a detection period. Further, until the timer completes counting of the detection period, the setting controller 121 sets the first control signal S1 to a low level. While the first control signal S1 has a low level, the output of the AND gate 14 is fixed to a low level, and thereby the power converter 10 stops operating.

Additionally, since the first control signal S1 has a low level, the first switch device 1203 is turned on and the second switch device 1204 is turned off. In other words, a short circuit between the first signal terminal 13C and the second signal terminal 13D are made by the first switch device 1203. As a result, a constant voltage outputted from the power supply 1200 is applied to the series circuit of the voltage dividing resistor 1202 and the first impedance device 21.

The first setter 123 estimates the impedance (resistance) of the first impedance device 21 from the measurement (the first detected voltage V2) of the voltage at the connection point of the voltage dividing resistor 1202 and the first signal terminal 13C. The first detected voltage V2 is represented by the relation of $V2 = V1 \times R2/(R1+R2)$, wherein V1 represents the voltage of the power supply 1200, R1 represents the resistance of the voltage dividing resistor 1202, and R2 represents the resistance of the first impedance device 21. The voltage V1 and the resistance R1 are known, and therefore the resistance R2 of the first impedance device 21 can be obtained (estimated) by calculation from the first detected voltage V2. Thereafter, the first setter 123 determines the desired value Ix associated with the resistance R2, and outputs the determined desired value Ix to the memory 128. Since the first control signal S1 has a low level, the memory 128 stores the desired value Ix outputted from the first setter 123.

When the timer finishes counting of the detection period, the setting controller 121 sets the first control signal S1 to a high level. When the first control signal S1 has a high level, the first switch device 1203 is turned off and the second switch device 1204 is turned on. As a result, the second switch device 1204 makes a short circuit between the second signal terminal 13D and the second output terminal 13B.

When the first control signal S1 has a high level, the drive signal SD is outputted from the AND gate 14 and is provided to the switching device of the power converter 10. Hence, the power converter 10 starts to operate, and thus outputs DC voltage/DC current suitable for the electric property of the light source device 2 to the light source device 2. Further, the memory 128 outputs the desired value Ix stored when the first control signal S1 has a low level, to the adder 127.

In this regard, while the DC current is supplied from the power converter 10 to the light source unit 20, the first control signal S1 is kept having a high level, and the first switch device 1203 is kept turned off and the second switch device 1204 is kept turned on. Consequently, no current flows through the first impedance device 21 of the light source device 2 and thus no power is consumed.

Note that, when the temperature of the light source unit 20 increases due to energization, the impedance (resistance) of the second impedance device 23 also increases. When the impedance increases and thereby the second detected voltage V3 ($=V1 \times Rx/(R1+Rx)$) exceeds the threshold, the adjustment value ΔIx which increases with an increase in the second detected voltage V3 is outputted from the second setter 125 to the adder 127. Thus, the desired value Ixy outputted from the adder 127 to the output controller 11 is decreased by the adjustment value ΔIx, and therefore the DC current supplied from the power converter 10 to the light source unit 20 is reduced. Consequently, an increase in the temperature of the light source unit 20 is suppressed.

Note that, in the present embodiment, the second impedance device 23 is exemplified by a thermosensitive resistor, as with Embodiment 2. However, the second impedance device 23 may be a photoelectric conversion element whose impedance changes depending on intensity of light emitted from the light source unit 20. When the second impedance device 23 is such a photoelectric conversion element, it is possible to adjust the output current depending on intensity of light.

The lighting device 1 of the present embodiment offers advantages that processings for estimating the impedance of the first impedance device 21 can be more simplified than in the case of the lighting device 1 of Embodiment 2.

Embodiment 4

Figure 4:
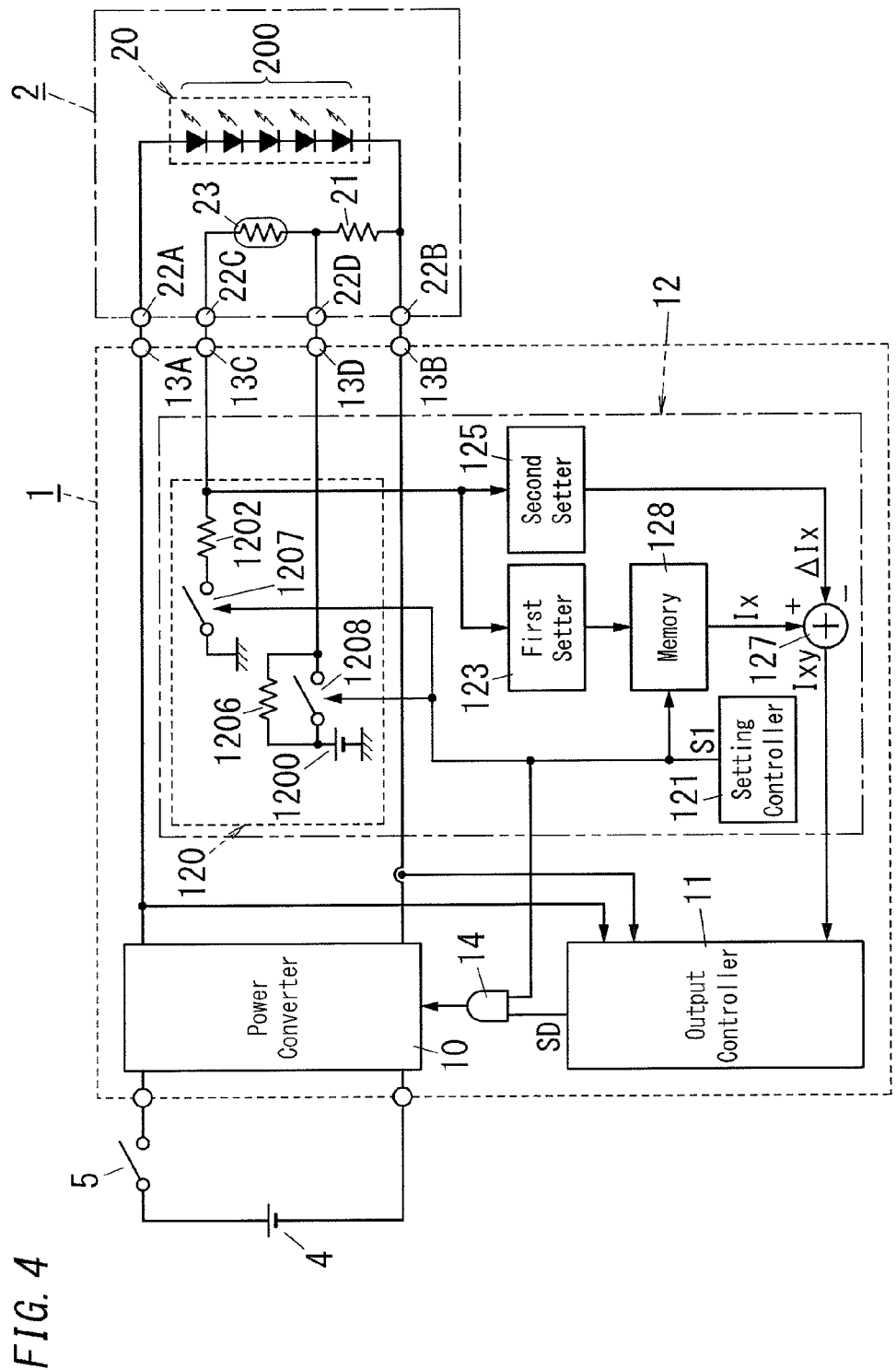
FIG. 4 is a circuit configuration diagram illustrating the illuminating device of Embodiment 4 in accordance with the present invention.

Hereinafter, the lighting device 1 and the light source device 2 of the present embodiment are described with reference to FIG. 4. Note that, the light source device 2 of the present embodiment is same as the light source devices 2 of Embodiments 2 and 3. Further, the lighting device 1 of the present embodiment is same in basic configurations as the lighting device 1 of Embodiment 3. Note that, the same components as the lighting device 1 and the light source device 2 of Embodiment 3 are designated by the same reference signs as the lighting device 1 and the light source device 2 of Embodiment 3 in order to avoid redundant description.

The lighting device 1 of the present embodiment is different from Embodiment 3 in the configuration of the detection block 120 of the controller 12. The detection block 120 of the present embodiment mainly includes the power supply 1200, the first voltage dividing resistor 1202, a second voltage dividing resistor 1206, a first switch device 1207, and a second switch device 1208.

The controller 12 includes the power supply 1200 and is configured to perform the first process and the second process. The power supply 1200 is electrically connected to the second signal terminal 13D. Further, the controller 12 includes the switch device 1207 connected between the first signal terminal 13C and the ground.

The controller 12 is configured to, in the first process, obtain the first measurement by supplying power from the power supply 1200 to the first impedance device 21 via the second output terminal 13B while prohibiting output of the DC power for lighting from the power converter 10, and determine the operating condition for the power converter 10 based on the first measurement. Further, the controller 12 is configured to, in the first process, turn off the switch device 1207 to supply power from the power supply 1200 to the first impedance device 21 via the second signal terminal 13D and the second output terminal 13B.

The controller 12 is configured to, in the second process, control the power converter 10 so that the DC power for lighting of the power converter 10 satisfies the operating condition determined in the first process.

Further, the controller 12 is configured to, in the second process, obtain the second measurement by supplying power from the power supply 1200 to the second impedance device 23 via the first and second signal terminals 13C and 13D, and modify, based on the second measurement, the operating condition determined in the first process. Further, the controller 12 is configured to, in the second process, turn on the switch device 1207 to supply power from the power supply 1200 to the second impedance device 23 via the second signal terminal 13D and the first signal terminal 13C while keeping voltage across the first impedance device 21 constant.

Hereinafter, the controller 12 is described in detail.

The first end of the second voltage dividing resistor 1206 and the first end of the second switch device 1208 are electrically connected to the positive electrode of the power supply 1200. Additionally, the second end of the second voltage dividing resistor 1206 and the second end of the second switch device 1208 are electrically connected to the second signal terminal 13D.

The first end of the first voltage dividing resistor 1202 is electrically connected to the first signal terminal 13C, and the second end of the first voltage dividing resistor 1202 is electrically connected to the first switch device 1207. Further, the second end of the first switch device 1207 and the negative electrode of the power supply 1200 are electrically connected to the ground. Note that, each of the first switch device 1207 and the second switch device 1208 is configured to turn on when the first control signal S1 outputted from the setting controller 121 has a high level and to turn off when the first control signal S1 has a low level. Besides, it is preferable that these two switch devices 1207 and 1208 be an n-channel MOSFET, for example.

Next, the operation of the lighting device 1 of the present embodiment is described. When the power supply switch 5 is turned on, the output controller 11 and the controller 12 start to operate. The setting controller 121 activates the timer immediately after the time of starting operation, and causes the timer to count that detection period. Further, until the timer completes counting of the detection period, the setting controller 121 sets the first control signal S1 to a low level. While the first control signal S1 has a low level, the output of the AND gate 14 is fixed to a low level, and thereby the power converter 10 stops operating.

Additionally, the first control signal S1 has a low level, and therefore both the first switch device 1207 and the second switch device 1208 turn off. Hence, the positive electrode of the power supply 1200 is electrically connected to the second signal terminal 13D via the second voltage dividing resistor 1206. In this case, input impedances of the first setter 123 and the second setter 125 electrically connected to the first signal terminal 13C are sufficiently larger than the impedance of the second impedance device 23. Therefore, no current flows through the second impedance device 23. In other words, the constant voltage given by the power supply 1200 is applied across only the series circuit of the second voltage dividing resistor 1206 and the first impedance device 21.

The first setter 123 estimates the impedance (resistance) of the first impedance device 21 based on the measurement (the first detected voltage V2) of the voltage at the connection point between the second voltage dividing resistor 1206 and the first signal terminal 13C. The first measurement V2 is represented by the relation of $V2=V1 \times R2/(R4+R2)$ wherein V1 represents the voltage of the power supply 1200, R4 represents the resistance of the second voltage dividing resistor 1206, and R2 represents the resistance of the first impedance device 21. The voltage V1 and the resistance R4 are known, and therefore the resistance R2 of the first impedance device 21 can be obtained (estimated) by calculation from the first detected voltage V2. Thereafter, the first setter 123 determines the desired value Ix associated with the resistance R2, and outputs the determined desired value Ix to the memory 128. Since the first control signal S1 has a low level, the memory 128 stores the desired value Ix outputted from the first setter 123.

When the timer finishes counting of the detection period, the setting controller 121 sets the first control signal S1 to a high level. When the first control signal S1 has a high level, both the first switch device 1207 and the second switch device 1208 turn on. As a result, the first signal terminal 13C is electrically connected to the ground via the first voltage dividing resistor 1202 and the first switch device 1207, and the second signal terminal 13D is electrically connected to the positive electrode of the power supply 1200 via the second switch device 1208.

When the first control signal S1 has a high level, the drive signal SD is outputted from the AND gate 14 and is provided to the switching device of the power converter 10. Hence, the power converter 10 starts to operate, and thus outputs DC voltage/DC current suitable for the electric property of the light source device 2 to the light source device 2. Further, the memory 128 outputs the desired value Ix stored when the first control signal S1 has a low level, to the adder 127.

In this regard, a potential at the second signal terminal 13D (which is equal to a potential relative to the ground, and this definition is also used in the following) is kept equal to the potential (constant potential) at the positive electrode of the power supply 1200. In other words, the potential at the second signal terminal 22D electrically connected to the second signal terminal 13D is also kept constant. Hence, the second detected voltage V3 (the potential at the connection point of the first voltage dividing resistor 1202 and the first signal terminal 13C) are not likely to suffer from an effect of a voltage drop caused by a contact resistance between a contact of the second power supply terminal 22B and a contact of the second output terminal 13B. In this case, the second detected voltage V3 is represented by the relation of $V3=V1\times R1/(R1+Rx)$. Hence, when the impedance of the second impedance device 23 increases with an increase in temperature of the light source unit 20, the second detected voltage V3 decreases in inverse proportion to the impedance of the second impedance device 23.

Note that, when the temperature of the light source unit 20 increases due to energization, the impedance (resistance) of the second impedance device 23 also increases. When the impedance increases and thereby the second detected voltage V3 falls below the threshold, the adjustment value $\Delta Ix$ which increases with a decrease in the second detected voltage V3 is outputted from the second setter 125 to the adder 127. Thus, the desired value Ixy outputted from the adder 127 to the output controller 11 is decreased by the adjustment value $\Delta Ix$, and therefore the DC current supplied from the power converter 10 to the light source unit 20 is reduced. Consequently, an increase in the temperature of the light source unit 20 is suppressed.

Note that, in the present embodiment, the second impedance device 23 is exemplified by a thermosensitive resistor, as with Embodiments 2 and 3. However, the second impedance device 23 may be a photoelectric conversion element whose impedance changes depending on intensity of light emitted from the light source unit 20.

The lighting device 1 of the present embodiment offers advantages that processing for estimating the impedance of the first impedance device 21 can be more simplified than in the case of the lighting device 1 of Embodiment 2. Additionally, it is possible to independently adjust a voltage dividing ratio (the resistance R4 of the second voltage dividing resistor 1206) for the first detected voltage V2 and a voltage dividing ratio (the resistance R1 of the first voltage dividing resistor 1202) for the second detected voltage V3.

Embodiment 5

Figure 5:
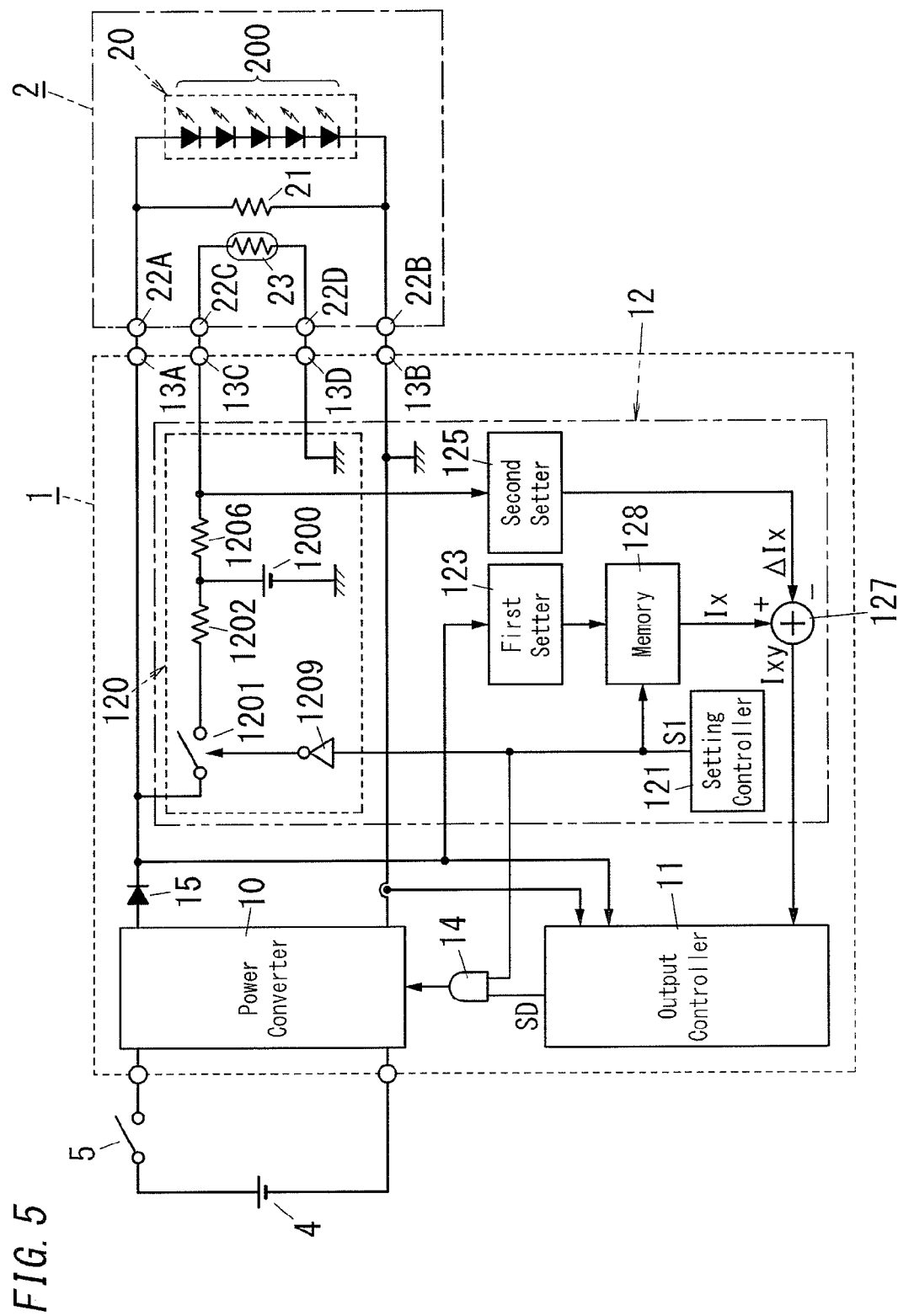
FIG. 5 is a circuit configuration diagram illustrating the illuminating device of Embodiment 5 in accordance with the present invention.

Hereinafter, the lighting device 1 and the light source device 2 of the present embodiment are described with reference to FIG. 5. Note that, the lighting device 1 and the light source device 2 of the present embodiment are same in basic configurations as the lighting device 1 and the light source device 2 of Embodiments 3 and 4. Note that, the same components as the lighting device 1 and the light source device 2 of Embodiments 3 and 4 are designated by the same reference signs as the lighting device 1 and the light source device 2 of Embodiments 3 and 4 in order to avoid redundant description.

In the light source device 2 of the present embodiment, the first impedance device 21 is electrically connected to the first power supply terminal 22A and the second power supply terminal 22B so as to be in parallel with the light source unit 20, and the second impedance device 23 is electrically connected between the first signal terminal 13C and the second signal terminal 13D. In summary, the first impedance device 21 is connected in parallel with the light source unit 20 between the first and second power supply terminals 22A and 22B.

The lighting device 1 of the present embodiment is different from Embodiment 4 in the configuration of the detection block 120 of the controller 12. The detection block 120 of the present embodiment mainly includes the power supply 1200, the switch device 1201, the first voltage dividing resistor 1202, the second voltage dividing resistor 1206, and a NOT gate 1209. The controller 12 includes the power supply 1200 and is configured to perform the first process and the second process.

The controller 12 is configured to, in the first process, obtain the first measurement by supplying power from the power supply 1200 to the first impedance device 21 via the second output terminal 13B while prohibiting output of the DC power for lighting from the power converter 10, and determine the operating condition for the power converter 10 based on the first measurement. Further, the controller 12 is configured to, in the first process, supply power from the power supply 1200 to the first impedance device 21 via the first and second output terminals 13A and 13B. In this regard, the power from the power supply 1200 in the first process satisfies a condition where the light source unit 20 is not lit. In other words, the power supply 1200 is configured to not light the light source unit 20.

The controller 12 is configured to, in the second process, control the power converter 10 so that the DC power for lighting of the power converter 10 satisfies the operating condition determined in the first process.

Further, the controller 12 is configured to, in the second process, obtain the second measurement by supplying power from the power supply 1200 to the second impedance device 23 via the first and second signal terminals 13C and 13D, and modify, based on the second measurement, the operating condition determined in the first process.

Especially, in the present embodiment, the power supply 1200 is electrically connected to the first output terminal 13A and the first signal terminal 13C. The controller 12 includes the switch device 1201 connected between the power supply 1200 and the first output terminal 13A. The controller 12 is configured to, in the first process, turn on the switch device 1201 to supply power from the power supply 1200 to the first impedance device 21 via the first output terminal 13A and the second output terminal 13B. The controller 12 is configured to, in the second process, turn off the switch device 1201 to supply power from the power supply 1200 to the second impedance device 23 via the second signal terminal 13D and the first signal terminal 13C while keeping voltage across the first impedance device 21 constant.

Hereinafter, the controller 12 is described in detail.

The first end of the first voltage dividing resistor 1202 and the first end of the second voltage dividing resistor 1206 are electrically connected to the positive electrode of the power supply 1200. The second end of the second voltage dividing resistor 1206 is electrically connected to the first signal terminal 13C. The second end of the first voltage dividing resistor 1202 is electrically connected to the first output terminal 13A via the switch device 1201. Further, there is a diode 15 which has an anode electrically connected to a high potential side output terminal of the power converter 10 and a cathode electrically connected to the first end of the switch device 1201 and the first output terminal 13A.

The second signal terminal 13D is electrically connected to the ground. The second output terminal 13B is electrically connected to the ground and the lower potential side output terminal of the power converter 10. The NOT gate 1209 is configured to inverse the first control signal S1 and output the inversed first control signal S1 to the switch device 1201. Therefore, the switch device 1201 turns on when the first control signal S1 has a low level, and the switch device 1201 turns off when the first control signal S1 has a high level.

The first setter 123 is configured to measure a potential at the first output terminal 13A (i.e., a difference in potential between the first output terminal 13A and the ground) as the first detected voltage V2. Like Embodiments 1 to 4, the second setter 125 is configured to measure a potential at the first signal terminal 13C (i.e., a difference in potential between the first signal terminal 13C and the ground) as the second detected voltage V3.

Next, the operation of the lighting device 1 of the present embodiment is described. When the power supply switch 5 is turned on, the output controller 11 and the controller 12 start to operate. The setting controller 121 activates the timer immediately after the time of starting operation, and causes the timer to count the detection period. Additionally, until the timer completes counting of the detection period, the setting controller 121 sets the first control signal S1 to a low level. While the first control signal S1 has a low level, the output of the AND gate 14 is fixed to a low level, and thereby the power converter 10 stops operating.

Further, since the first control signal S1 has a low level, the switch device 1201 turns on. Therefore, the positive electrode of the power supply 1200 is electrically connected to the first output terminal 13A via the first voltage dividing resistor 1202. Note that, the output voltage of the power supply 1200 is set to a voltage which is sufficiently lower than a minimum operation voltage of the light source unit 20 (=the minimum forward voltage of each LED 200×the number of LEDs 200 connected in series), and therefore no current flows through the light source unit 20. As a result, the constant voltage outputted from the power supply 1200 is applied across only the series circuit of the first voltage dividing resistor 1202 and the first impedance device 21.

The first setter 123 estimates the impedance (resistance) of the first impedance device 21 based on the first detected voltage V2. The first detected voltage V2 is represented by the relation of V2=V1×R2/(R1+R2), wherein V1 represents the voltage of the power supply 1200, R1 represents the resistance of the first voltage dividing resistor 1202, and R2 represents the resistance of the first impedance device 21. The voltage V1 and the resistance R1 are known, and therefore the resistance R2 of the first impedance device 21 can be calculated (estimated) from the first detected voltage V2. Then, the first setter 123 determines the desired value Ix associated with the resistance R2, and outputs the determined desired value Ix to the memory 128. Since the first control signal S1 has a low level, the memory 128 stores the desired value Ix outputted from the first setter 123.

When the timer finishes counting of the detection period, the setting controller 121 sets the first control signal S1 to a high level. When the first control signal S1 has a high level, the switch device 1201 turns off. As a result, the power supply 1200 is separated from the first output terminal 13A. Consequently, the voltage of the power supply 1200 is applied across the second impedance device 23 via the first signal terminals 13C and 22C and the second signal terminals 13D and 22D.

When the first control signal S1 has a high level, the drive signal SD is outputted from the AND gate 14 and then is supplied to the switching device of the power converter 10. Hence, the power converter 10 starts to operate, and thus outputs DC voltage/DC current suitable for the electric property of the light source device 2 to the light source device 2. Further, the memory 128 outputs the desired value Ix stored when the first control signal S1 has a low level, to the adder 127.

Note that, when the temperature of the light source unit 20 increases due to energization, the impedance (resistance) of the second impedance device 23 also increases. When the impedance increases and thereby the second detected voltage V3 exceeds the threshold, the adjustment value ΔIx which increases with an increase in the second detected voltage V3 is outputted from the second setter 125 to the adder 127. Thus, the desired value Ixy outputted from the adder 127 to the output controller 11 is decreased by the adjustment value ΔIx, and therefore the DC current supplied from the power converter 10 to the light source unit 20 is reduced. Consequently, an increase in the temperature of the light source unit 20 is suppressed.

Besides, it is preferable that the impedance (resistance) of the first impedance device 21 be sufficiently larger than the impedance of the light source unit 20 (the sum of on-resistances of the LEDs 200). When the impedance of the first impedance device 21 is sufficiently larger than the impedance of the light source unit 20, power consumed in the first impedance device 21 while the light source unit 20 is in operation can be reduced, and the error of output control caused by the output controller 11 can be suppressed.

Embodiment 6

Figure 6:
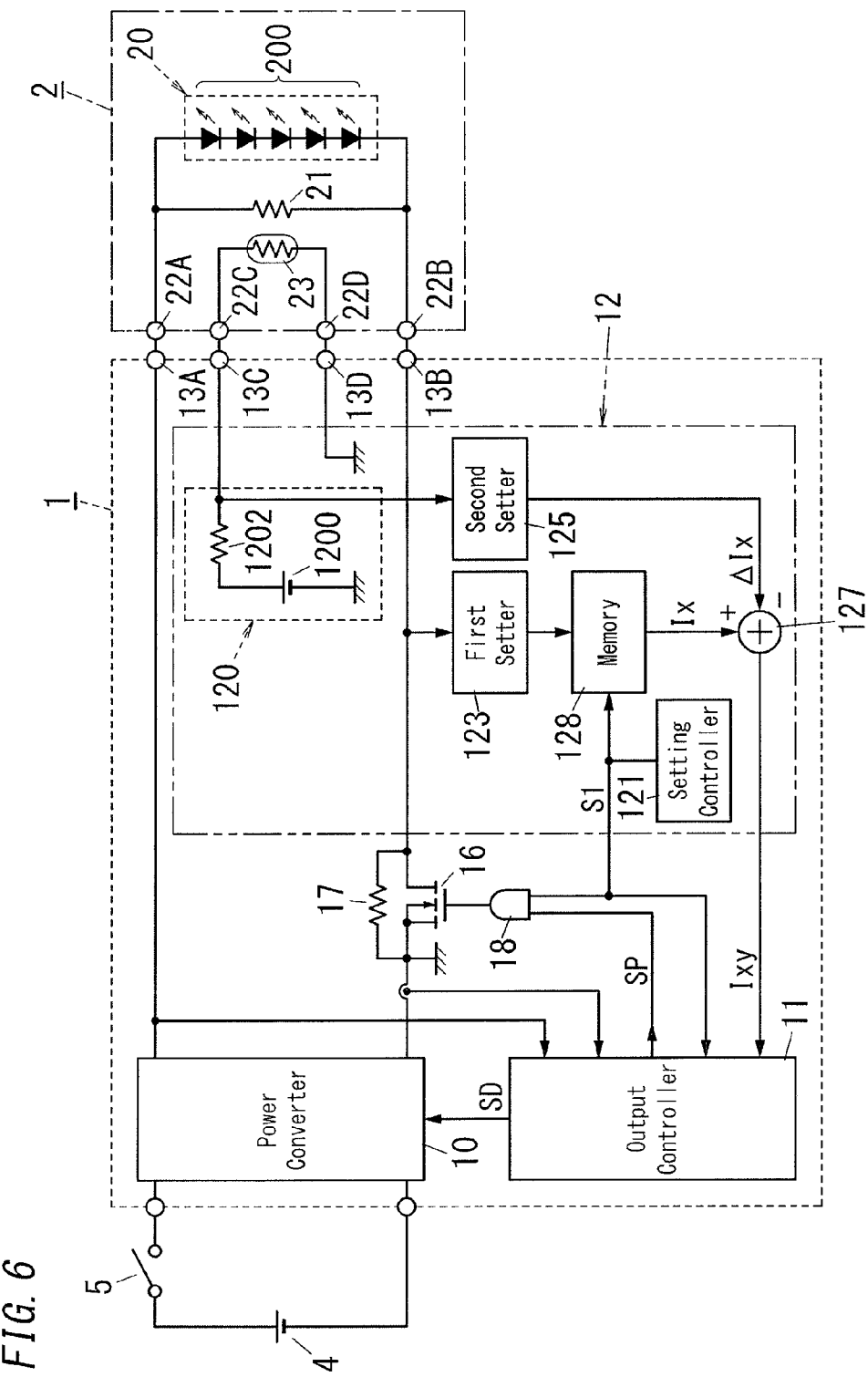
FIG. 6 is a circuit configuration diagram illustrating the illuminating device of Embodiment 6 in accordance with the present invention.

Hereinafter, the lighting device 1 and the light source device 2 of the present embodiment are described with reference to FIG. 6. Note that, the light source device 2 of the present embodiment is same as the light source device 2 of Embodiment 5. Further, the lighting device 1 of the present embodiment is same in basic configurations as the lighting device 1 of Embodiment 5. Hence, the same components as the lighting device 1 and the light source device 2 of Embodiment 5 are designated by the same reference signs as the lighting device 1 and the light source device 2 of Embodiment 5 in order to avoid redundant description.

The lighting device 1 of the present embodiment includes a parallel circuit of the switching device 16 and a resistor 17, and this parallel circuit is electrically connected between the low potential side output terminal of the power converter 10 and the second output terminal 13B. The switching device 16 is an n-channel MOSFET, and has a drain electrically connected to the second output terminal 13B, and has a source electrically connected to the low potential side output terminal of the power converter 10. Additionally, the switching device 16 has a gate electrically connected to an output terminal of an AND gate 18. Accordingly, the switching device 16 turns on when the output of the AND gate 18 has a high level, and turns off when the output of the AND gate 18 has a low level.

The AND gate 18 performs logical conjunction of a PWM (Pulse Width Modulation) signal SP outputted from the output controller 11 and the first control signal S1 outputted from the setting controller 121. Therefore, the output of the AND gate 18 has a high level when both the PWM signal SP and the first control signal S1 have high levels, and the output of the AND gate 18 has a low level when at least one of the PWM signal SP and the first control signal S1 has a low level.

For example, the output controller 11 generates the PWM signal SP which has a frequency sufficiently lower than the driving frequency of the drive signal SD for the switching device of the power converter 10, and has the duty cycle associated with the dimming level given by the external device. In other words, the output controller 11 is configured to set the duty cycle to 100% when the dimming level indicates 100% (rated lighting), and decrease the duty cycle with a decrease in the dimming level.

When the dimming level is 100%, the output controller 11 controls the power converter 10 so that the output current of the power converter 10 is equal to the desired value Ixy, in a similar manner to Embodiments 2 to 5. In contrast, when the dimming level is less than 100%, the output controller 11 outputs the PWM signal SP with the duty cycle associated with the dimming level, and controls the power converter 10 so that the output current is equal to the desired value Ixy while the PWM signal SP has a high level (i.e., the switching device 16 is on).

When the switching device 16 is on, the output current of the power converter 10 is supplied to the light source unit 20 while the output current of the power converter 10 is not substantially reduced and has an almost original value. In contrast, when the switching device 16 is off, the output current of the power converter 10 is limited by the resistor 17 connected in parallel with the switching device 16 and therefore is reduced. In summary, a period in which the output current is limited by the resistor 17 is prolonged with a decrease in the duty cycle (an increase in the off period of the switching device 16). Hence, an amount of power supplied from the power converter 10 to the light source unit 20 per unit time is reduced, and thus the light source unit 20 is dimmed.

The controller 12 includes the power supply 1200 and is configured to perform the first process and the second process. The power supply 1200 is electrically connected to the first signal terminal 13C. The controller 12 is configured to, in the first process, obtain the first measurement by supplying power from the power converter 10 to the first impedance device 21 via the first and second output terminals 13A and 13B, and determine the operating condition for the power converter 10 based on the first measurement. Further, the controller 12 is configured to, in the first process, control the power converter 10 to function as the power supply 1200. In other words, in the first process, the controller 12 causes the power converter 10 to supply power which does not cause the light source unit 20 to light, instead of the DC power for lighting, to the first impedance device 21.

The controller 12 is configured to, in the second process, control the power converter 10 so that the DC power for lighting of the power converter 10 satisfies the operating condition determined in the first process.

Further, the controller 12 is configured to, in the second process, obtain the second measurement by supplying power from the power supply 1200 to the second impedance device 23 via the first and second signal terminals 13C and 13D, and modify, based on the second measurement, the operating condition determined in the first process.

Hereinafter, the controller 12 is described in detail.

The detection block 120 in the present embodiment is constituted by the power supply 1200 and the voltage dividing resistor 1202. The positive electrode of the power supply 1200 is electrically connected to the first signal terminal 13C via the voltage dividing resistor 1202. The power supply 1200 and the second signal terminal 13D are electrically connected to the ground. In other words, the second impedance device 23 and the voltage dividing resistor 1202 of the light source device 2 are electrically in series via the first signal terminals 13C and 22C and the second signal terminals 13D and 22D, and therefore the constant voltage of the power supply 1200 is applied across the series circuit of the second impedance device 23 and the voltage dividing resistor 1202.

Next, the operation of the lighting device 1 of the present embodiment is described. When the power supply switch 5 is turned on, the output controller 11 and the controller 12 start to operate. The setting controller 121 activates the timer immediately after the time of starting operation, and causes the timer to count the detection period. Additionally, until the timer completes counting of the detection period, the setting controller 121 sets the first control signal S1 to a low level. While the first control signal S1 has a low level, the output of the AND gate 18 is set to a low level, and thereby the switching device 16 is kept off.

When the first control signal S1 has a low level, the output controller 11 controls the power converter 10 to output a constant voltage sufficiently lower than the minimum operation voltage of the light source unit 20. In this case, the output current of the power converter 10 does not flow through the light source unit 20 but flows through only the first impedance device 21.

While the first control signal S1 has a low level, the first setter 123 measures a potential at a connection point of the second output terminal 13B and the resistor 17 (i.e., a difference in potential between the connection point and the ground) as the first detected voltage V2. The first detected voltage V2 is represented by the relation of $V2=Vo \times R5/(R2+R5)$, wherein Vo represents the output voltage of the power converter 10, R5 represents the resistance of the resistor 17, and R2 represents the impedance of the first impedance device 21. The output voltage Vo and the resistance R5 are known, and therefore the first setter 123 can calculate (estimate) the resistance R2 of the first impedance device 21 from the first detected voltage V2. Then, the first setter 123 determines the desired value Ix associated with the resistance R2, and outputs the determined desired value Ix to the memory 128. Since the first control signal S1 has a low level, the memory 128 stores the desired value Ix outputted from the first setter 123.

Note that, the second setter 125 measures the second detected voltage V3 continuously. While the second detected voltage V3 is not larger than the threshold, the second setter 125 does not output anything. In contrast, while the second detected voltage V3 is larger than the threshold, the second setter 125 outputs to the adder 127 the adjustment value ΔIx increasing with an increase in the second detected voltage V3.

When the timer finishes counting of the detection period, the setting controller 121 sets the first control signal S1 to a high level. When the first control signal S1 has a high level, the AND gate 18 outputs the PWM signal outputted from the output controller 11, without any modification. For this reason, the switching device 16 is kept on while the PWM signal SP has a high level, and is kept off while the PWM signal SP has a low level.

When the first control signal S1 has a high level, the output controller 11 performs constant current control on the power converter 10 so that the output current of the power converter 10 is equal to the desired value Ixy outputted from the adder 127. Note that, when the dimming level is less than 100%, the output controller 11 controls the power converter 10 so that the output current is equal to the desired value Ixy while the PWM signal SP has a high level (i.e., the switching device 16 is on). In summary, the output controller 11 controls the power converter 10 by outputting the PWM signal SP with the duty cycle associated with the dimming level, and thereby dimming the light source unit 20.

Note that, when the temperature of the light source unit 20 increases due to energization, the impedance (resistance) of the second impedance device 23 also increases. When the impedance increases and thereby the second detected voltage V3 exceeds the threshold, the adjustment value ΔIx which increases with an increase in the second detected voltage V3 is outputted from the second setter 125 to the adder 127. Thus, the desired value Ixy outputted from the adder 127 to the output controller 11 is decreased by the adjustment value ΔIx. Therefore, the DC current supplied from the power converter 10 to the light source unit 20 when the switching device 16 is on is reduced. Consequently, an increase in the temperature of the light source unit 20 is suppressed.

Besides, in a similar manner to Embodiment 5, it is preferable that the impedance (resistance) of the first impedance device 21 and the resistance of the resistor 17 be sufficiently larger than the impedance of the light source unit 20 (the sum of on-resistances of the LEDs 200). According to the above settings, power consumed in the first impedance device 21 while the light source unit 20 is in operation can be reduced, and the error of output control caused by the output controller 11 can be suppressed.

As described above, in the lighting device 1 of the present embodiment, it is preferable that the controller 12 be configured to cause the power supply to provide to the parallel circuit of the first impedance device 21 and the light source unit 20 the constant voltage or the constant current which satisfies a condition in which the light source unit 20 is not lit, in a period from the time of starting operation to the time immediately before lighting. Further, it is preferable that the controller 12 be configured to measure the impedance of the first impedance device 21 and determine the desired value Ixy associated with the measurement result of the impedance to light the light source unit 20.

Further, in the lighting device 1 of the present embodiment, it is preferable that the power converter 10 double as the power supply. It is preferable that the controller 12 be configured to control the power converter 10 by setting the constant voltage or the constant current to the desired value Ixy while the light source unit 20 is not lit.

Note that, although the light source device 2 includes the second impedance device 23 in Embodiments 2 to 6, the lighting device 1 may include the second impedance device 23. For example, when the second impedance device 23 is a thermosensitive resistor, the output of the power converter 10 may be adjusted in accordance with the temperature of the lighting device 1, provided that there is a high correlation between the temperature of the lighting device 1 and the temperature of the light source unit 20. Alternatively, a circuit for setting the desired value of the output current may not include the second impedance device 23 and rely on only the first impedance.

Note that, the controller 12 in each of Embodiments 1 to 6 may be constituted by an analog circuit or a digital circuit. For example, the controller 12 may be realized by a combination of hardware (e.g., a microcontroller) and software. Note that, in Embodiments 1 to 4, the first setter 123 and the second setter 125 measure the first detected voltage V2 and the second detected voltage V3 at the same position, respectively. For this reason, when the first setter 123 and the second setter 125 are realized by a combination of a microcontroller and software, the first detected voltage V2 and the second detected voltage V3 can be taken through the same input port.

Embodiment 7

Figure 7:
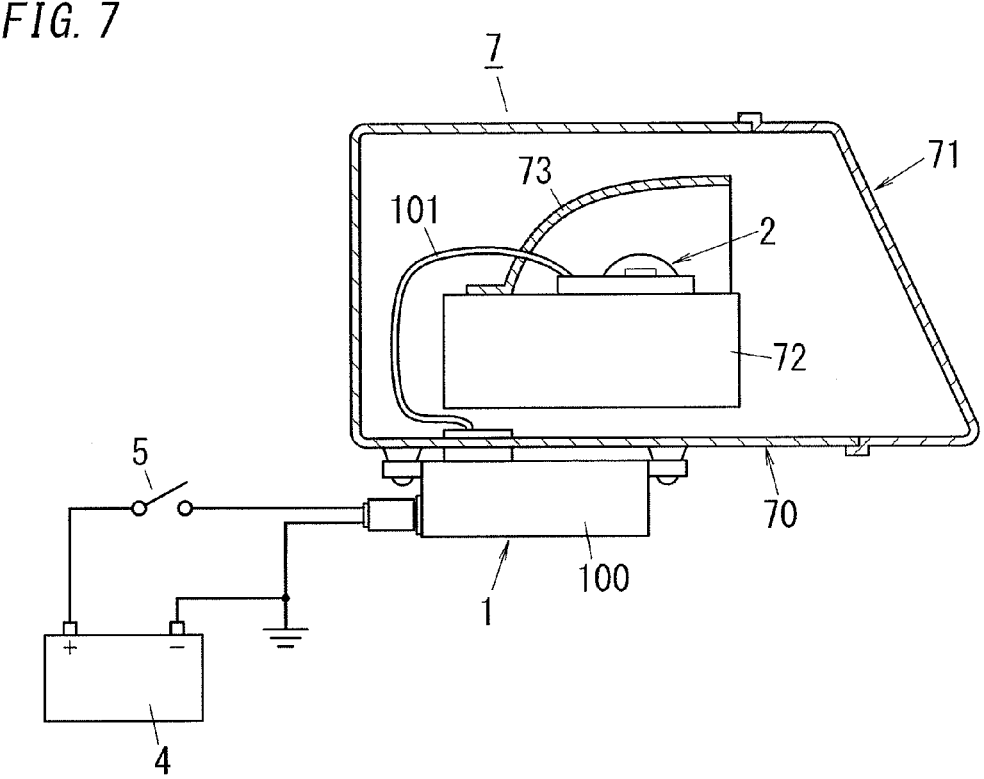
FIG. 7 is a section illustrating the vehicular headlight of Embodiment 7 in accordance with the present invention.
Figure 8:
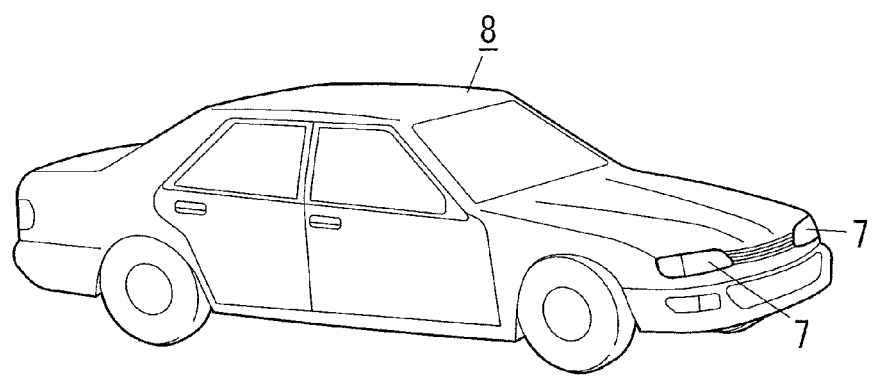
FIG. 8 is a perspective view illustrating the vehicle including the vehicular headlight of Embodiment 7.

FIG. 7 shows a vehicular headlight of one embodiment according to the present invention. The vehicular headlight (hereinafter, referred to as "headlight") of the present embodiment includes the lighting device 1, and a lamp fitting 7 which is for holding the lighting device 1 and is to be fixed to a vehicle 8. As shown in FIG. 8, the lamp fitting 7 is attached to each of left and right sides of a front side of the vehicle 8 such as an ordinary vehicle (automobile).

The lamp fitting 7 mainly includes a lamp fitting body 70, a cover 71, a heat dissipater 72, and a reflective plate 73. The lamp fitting body 70 is made of synthetic resin and is in a hollow cylindrical shape with an open front face and a bottom. The cover 71 is made of light-transmissive material such as quartz glass and acrylic resin, and is in a hollow cylindrical shape with an open rear face and a bottom. A front end of the lamp fitting body 70 and a rear end of the cover 71 are connected to each other, and the light source device 2, the heat dissipater 72, and the reflective plate 73 are accommodated in an inside of the lamp fitting body 70 which is covered with the cover 71.

For example, the heat dissipater 72 may include multiple heat dissipation fins which are arranged on a surface of a flat plate and are made of aluminum die-casting products. The light source device 2 and the reflective plate 73 are attached to an upper face of the heat dissipater 72. The reflective plate 73 is in a semispherical shape, and is configured to reflect forward, rays of light emitted from the light source device 2 at its inner face.

The lighting device 1 of the present embodiment may be any of the lighting devices 1 of Embodiments 1 to 6. The lighting device 1 of the present embodiment is accommodated in a case 100 and is attached to a lower face or an inside of the lamp fitting body 70. Further, when the lighting device 1 is attached to the inside of the lamp fitting body 70, there is no need to accommodate the lighting device 1 in the case 100. Note that, it is preferable that the lighting device 1 and the light source device 2 are interconnected via a power supply cable 101.

Further, the lighting device 1 is electrically connected to a positive electrode and a negative electrode of a battery (the external power supply 4) mounted on the vehicle 8 via the power supply switch 5. Note that, it is preferable that the power supply switch 5 be provided to a combination switch mounted to a dashboard or a steering column of the vehicle 8.

Aspects of the Present Invention

As apparent from aforementioned Embodiments 1 to 7, the lighting device (1) of the first aspect in accordance with the present invention is a lighting device for lighting a light source device (2). The light source device (2) includes: first and second power supply terminals (22A and 22B); a light source unit (20) connected between the first and second power supply terminals (22A and 22B); and a first impedance device (21) which has an impedance associated with an electric property of the light source unit (20) and is connected to the second power supply terminal (22B). The lighting device (1) includes: first and second output terminals (13A and 13B) to be electrically connected to the first and second power supply terminals (22A and 22B), respectively; a power converter (10) configured to convert input power from an external device into DC power for lighting and output the DC power for lighting to the light source device (2) via the first and second output terminals (13A and 13B); and a controller (12) configured to control the power converter (10). The controller (12) includes a power supply (1200) and is configured to perform a first process and a second process. The controller (12) is configured to, in the first process, obtain a measurement indicative of the impedance of the first impedance device (21) by supplying power from the power supply (1200) to the first impedance device (21) via the second output terminal (13B) while prohibiting output of the DC power for lighting from the power converter (10), and determine an operating condition for the power converter (10) based on the measurement. The controller (12) is configured to, in the second process, control the power converter (10) so that the DC power for lighting of the power converter (10) satisfies the operating condition determined in the first process.

In other words, the lighting device (1) is a lighting device for lighting one or more selected from various types of light source devices (2) with different electric properties. The light source device (2) includes: a light source unit (20) including at least one solid light emitting elements (200) serving as a light source; a first impedance device (21) with a predetermined impedance associated with an electric property of the light source unit (20); and a pair of power supply terminals (22A and 22B) electrically connected to the light source unit (20). The light source device (2) is configured such that at least one of the pair of power supply terminals (22A and 22B) is electrically connected to the first impedance device (21). The lighting device (1) includes: a pair of output terminals (13A and 13B) to be electrically connected to the pair of power supply terminals (22A and 22B), respectively; a power converter (10) for converting input power from an external device into DC power and outputting the resultant DC power through the output terminals (13A and 13B); a power supply (1200) for providing constant voltage or constant current to the first impedance device (21) via at least one output terminal (13B); and a controller (12) for controlling the power converter (10) so that the output voltage/output current of the power converter (10) is equal to a desired value. The controller (12) is configured to measure an impedance of the first impedance device (21) by providing the constant voltage or the constant current from the power supply (1200) to the first impedance device (21) under a condition where the light source unit (20) is not lit in a period from the time of starting operation to the time immediately before lighting. The controller (12) is configured to select the desired value associated with the result of an impedance measurement or a detected voltage or a detected current of the first impedance device (21), and light the light source unit (20) according to the selected desired value.

In the lighting device (1) of the second aspect according to the present invention, realized in combination with the first aspect, the controller (12) is configured to perform the first process immediately prior to the second process.

In the lighting device (1) of the third aspect according to the present invention, realized in combination with the first or second aspect, the light source device (2) further includes a second impedance device (23) having a second impedance changing depending on a state of the light source unit (20). The lighting device (1) further includes first and second signal terminals (13C and 13D) to be electrically connected to first and second ends of the second impedance device (23), respectively. The controller (12) is configured to, in the second process, obtain a second measurement indicative of the second impedance of the second impedance device (23) by supplying power from the power supply (1200) to the second impedance device (23) via the first and second signal terminals (13C and 13D), and modify, based on the second measurement, the operating condition determined in the first process.

In other words, the light source device (2) includes a second impedance device (23) whose impedance changes depending on the state of the light source unit (20). The controller (12) is configured to measure the impedance of the second impedance device (23) under a condition where the light source unit (20) is light, and modify the desired value according to the measurement result of the impedance.

In the lighting device (1) of the fourth aspect according to the present invention, realized in combination with the third aspect, the first impedance device (21) is connected between the second end of the second impedance device (23) and the second power supply terminal (22B) so that the first impedance device (21) and the second impedance device (23) constitute a series circuit. The power supply (1200) is electrically connected to the first signal terminal (13C). The controller (12) is configured to, in the first process, obtain the measurement by supplying power from the power supply (1200) to the series circuit via the first signal terminal (13C) and the second output terminal (13B). The controller (12) is configured to, in the second process, obtain the second measurement by supplying power from the power supply (1200) to the second impedance device (23) via the first signal terminal (13C) and the second signal terminal (13D) while keeping voltage across the first impedance device (21) constant.

In other words, the light source device (2) includes a series circuit of the first impedance device (21) and the second impedance device (23). The controller (12) is configured to measure the impedance of the first impedance device (21) by providing the constant voltage or the constant current from the power supply (1200) to the series circuit under a condition where the light source unit (20) is not lit. The controller (12) is configured to measure the impedance of the second impedance device (23) by providing the constant voltage or the constant current from the power supply (1200) to only the second impedance device (23) under a condition where the light source unit (20) is lit while switching is made so that the voltage drop caused by the contact resistance of the power supply terminal electrically connected to the first impedance device (21) is canceled.

In the lighting device (1) of the fifth aspect according to the present invention, realized in combination with the fourth aspect, the controller (12) includes a switch (the switch device 1201) connected between the second signal terminal (13D) and the second output terminal (13B). The controller (12) is configured to, in the first process, turn off the switch (1201) to supply power from the power supply (1200) to the series circuit via the first signal terminal (13C) and the second output terminal (13B). The controller (12) is configured to, in the second process, turn on the switch (1201) to supply power from the power supply (1200) to the second impedance device (23) via the first and second signal terminals (13C and 13D) while keeping voltage across the first impedance device (21) constant.

In other words, the controller (12) includes a switch (1201) electrically connected to the power supply (1200) to be in parallel with the first impedance device (21). The controller (12) is configured to measure the impedance of the first impedance device (21) by providing the constant voltage or the constant current from the power supply (1200) to the first impedance device (21) by turning off the switch (1201) under a condition where the light source unit (20) is not lit. The controller (12) is configured to measure the impedance of the second impedance device (23) by providing the constant voltage or the constant current from the power supply (1200) to the second impedance device (23) by turning on the switch (1201) under a condition where the light source unit (20) is lit.

In the lighting device (1) of the sixth aspect according to the present invention, realized in combination with the third aspect, the first impedance device (21) is connected between the second end of the second impedance device (23) and the second power supply terminal (22B) so that the first impedance device (21) and the second impedance device (23) constitute a series circuit. The power supply (1200) is electrically connected to the first signal terminal (13C). The controller (12) includes: a first switch device (1203) connected between the first signal terminal (13C) and the second signal terminal (13D); and a second switch device (1204) connected between the second signal terminal (13D) and the second output terminal (13B). The controller (12) is configured to, in the first process, turn on the first switch device (1203) and turn off the second switch device (1204) to supply power from the power supply (1200) to the first impedance device (21) via the second signal terminal (13D) and the second output terminal (13B). The controller (12) is configured to, in the second process, turn off the first switch device (1203) and turn on the second switch device (1204) to supply power from the power supply (1200) to the second impedance device (23) via the first and second signal terminals (13C and 13D) while keeping voltage across the first impedance device (21) constant.

In the lighting device (1) of the seventh aspect according to the present invention, realized in combination with the third aspect, the first impedance device (21) is connected between the second end of the second impedance device (23) and the second power supply terminal (22B) so that the first impedance device (21) and the second impedance device (23) constitute a series circuit. The power supply (1200) is electrically connected to the second signal terminal (13D). The controller (12) includes a switch device (1207) connected between the first signal terminal (13C) and a ground. The controller (12) is configured to, in the first process, turn off the switch device (1207) to supply power from the power supply (1200) to the first impedance device (21) via the second signal terminal (13D) and the second output terminal (13B). The controller (12) is configured to, in the second process, turn on the switch device (1207) to supply power from the power supply (1200) to the second impedance device (23) via the first and second signal terminals (13C and 13D) while keeping voltage across the first impedance device (21) constant.

In the lighting device (1) of the eighth aspect according to the present invention, realized in combination with the first or second aspect, the first impedance device (21) is connected in parallel with the light source unit (20) between the first and second power supply terminals (22A and 22B). The controller (12) is configured to, in the first process, supply power from the power supply (1200) to the first impedance device (21) via the first and second output terminals (13A and 13B). Power from the power supply (1200) in the first process satisfies a condition where the light source unit (20) is not lit.

In other words, in the light source device (2), the first impedance device (21) is electrically connected in parallel with the light source unit (20). The controller (12) is configured to cause the power supply (1200) to provide to the parallel circuit of the first impedance device (21) and the light source unit (20) the constant voltage or the constant current which satisfies a condition in which the light source unit (20) is not lit, in a period from the time of starting operation to the time immediately before lighting, and thereby measure the impedance of the first impedance device (21), and determine the desired value associated with the measurement result of the impedance to light the light source unit (20).

In the lighting device (1) of the ninth aspect according to the present invention, realized in combination with the eighth aspect, the controller (12) is configured to, in the first process, control the power converter (10) to function as the power supply (1200).

In other words, the power converter (10) doubles as the power supply (1200). The controller (12) is configured to control the power converter (10) so as to set the constant voltage or the constant current to the desired value under a condition the light source unit (20) is not lit in a period from the time of starting operation to the time immediately before lighting.

The light source device (2) of the tenth aspect according to the present invention includes: first and second power supply terminals (22A and 22B); a light source unit (20) connected between the first and second power supply terminals (22A and 22B); and a first impedance device (21) which has an impedance associated with an electric property of the light source unit (20) and is connected to the second power supply terminal (22B).

In other words, the light source device (2) includes: a light source unit (20) including at least one solid light emitting elements (200) serving as a light source; a first impedance device (21) with a predetermined impedance associated with an electric property of the light source unit (20); and a pair of power supply terminals (22A and 22B) electrically connected to the light source unit (20). The light source device (2) is configured such that at least one of the pair of power supply terminals (22A and 22B) is electrically connected to the first impedance device (21).

In the light source device (2) of the eleventh aspect according to the present invention, realized in combination with the tenth aspect, the light source device (2) further includes a second impedance device (23) having a second impedance changing depending on a state of the light source unit (20).

In the light source device (2) of the twelfth aspect according to the present invention, realized in combination with the eleventh aspect, the first impedance device (21) and the second impedance device (23) constitute a series circuit.

In other words, the light source device (2) includes a series circuit of the first impedance device (21) and the second impedance device (23).

In the light source device (2) of the thirteenth aspect according to the present invention, realized in combination with the tenth or eleventh aspect, the first impedance device (21) is connected in parallel with the light source unit (20).

The illuminating device of the fourteenth aspect in accordance with the present invention includes: the lighting device (1) according to any one of the first to ninth aspects; and the light source device (2) according to any one of the tenth to thirteenth aspects.

The vehicular headlight of the fifteenth aspect in accordance with the present invention includes: the illuminating device of the fourteenth aspect; and a lamp fitting (7) which is for holding the illuminating device and is to be attached to a vehicle (8).

As described above, the lighting device, the light source device, the illuminating device and the vehicular headlight in accordance with the present invention offer advantages capable of suppressing false operation.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A lighting device for lighting a light source device, the light source device including:
    first and second power supply terminals;
    a light source unit connected between the first and second power supply terminals; and
        a first impedance device which has an impedance associated with an electric property of the light source unit and is connected to the second power supply terminal,
    the lighting device comprising:
        first and second output terminals to be electrically connected to the first and second power supply terminals, respectively;
    a power converter configured to convert input power from an external device into DC power for lighting and output the DC power for lighting to the light source device via the first and second output terminals; and
    a controller configured to control the power converter, the controller including a power supply and being configured to perform a first process and a second process,
    the controller being configured to, in the first process, obtain a measurement indicative of the impedance of the first impedance device by supplying power from the power supply to the first impedance device via the second output terminal while prohibiting output of the DC power for lighting from the power converter, and determine an operating condition for the power converter based on the measurement, and
    the controller being configured to, in the second process, control the power converter so that the DC power for lighting of the power converter satisfies the operating condition determined in the first process.

2. The lighting device according to claim 1, wherein the controller is configured to perform the first process immediately prior to the second process.

3. The lighting device according to claim 1, wherein:
    the light source device further includes a second impedance device having a second impedance changing depending on a state of the light source unit;
    the lighting device further comprises first and second signal terminals to be electrically connected to first and second ends of the second impedance device, respectively; and
    the controller is configured to, in the second process, obtain a second measurement indicative of the second impedance of the second impedance device by supplying power from the power supply to the second impedance device via the first and second signal terminals, and modify, based on the second measurement, the operating condition determined in the first process.

4. The lighting device according to claim 3, wherein:
    the first impedance device is connected between the second end of the second impedance device and the second power supply terminal so that the first impedance device and the second impedance device constitute a series circuit;
    the power supply is electrically connected to the first signal terminal;
    the controller is configured to, in the first process, obtain the measurement by supplying power from the power supply to the series circuit via the first signal terminal and the second output terminal; and
    the controller is configured to, in the second process, obtain the second measurement by supplying power from the power supply to the second impedance device via the first and second signal terminals while keeping voltage across the first impedance device constant.

5. The lighting device according to claim 4, wherein:
    the controller includes a switch connected between the second signal terminal and the second output terminal;
    the controller is configured to, in the first process, turn off the switch to supply power from the power supply to the series circuit via the first signal terminal and the second output terminal; and
    the controller is configured to, in the second process, turn on the switch to supply power from the power supply to the second impedance device via the first and second signal terminals while keeping voltage across the first impedance device constant.

6. The lighting device according to claim 3, wherein:
    the first impedance device is connected between the second end of the second impedance device and the second power supply terminal so that the first impedance device and the second impedance device constitute a series circuit;
    the power supply is electrically connected to the first signal terminal;
    the controller includes a first switch device connected between the first signal terminal and the second signal terminal, and
    a second switch device connected between the second signal terminal and the second output terminal;
    the controller is configured to, in the first process, turn on the first switch device and turn off the second switch device to supply power from the power supply to the first impedance device via the second signal terminal and the second output terminal; and
    the controller is configured to, in the second process, turn off the first switch device and turn on the second switch device to supply power from the power supply to the second impedance device via the first and second signal terminals while keeping voltage across the first impedance device constant.

7. The lighting device according to claim 3, wherein:
the first impedance device is connected between the second end of the second impedance device and the second power supply terminal so that the first impedance device and the second impedance device constitute a series circuit;
the power supply is electrically connected to the second signal terminal;
the controller includes a switch device connected between the first signal terminal and a ground;
the controller is configured to, in the first process, turn off the switch device to supply power from the power supply to the first impedance device via the second signal terminal and the second output terminal; and
the controller is configured to, in the second process, turn on the switch device to supply power from the power supply to the second impedance device via the first and second signal terminals while keeping voltage across the first impedance device constant.

8. The lighting device according to claim 1, wherein:
the first impedance device is connected in parallel with the light source unit between the first and second power supply terminals;
the controller is configured to, in the first process, supply power from the power supply to the first impedance device via the first and second output terminals; and
power from the power supply in the first process satisfies a condition where the light source unit is not lit.

9. The lighting device according to claim 8, wherein the controller is configured to, in the first process, control the power converter to function as the power supply.

10. An illuminating device, comprising:
the lighting device according to claim 1; and
a light source device, comprising:
first and second power supply terminals;
a light source unit connected between the first and second power supply terminals; and
a first impedance device which has an impedance associated with an electric property of the light source unit and is connected to the second power supply terminal.

11. A vehicular headlight, comprising:
the illuminating device according to claim 10; and
a lamp fitting which is for holding the illuminating device and is to be attached to a vehicle.

* * * * *